United States Patent
Oba et al.

(10) Patent No.: US 10,778,783 B2
(45) Date of Patent: Sep. 15, 2020

(54) SERVICE PROVIDING APPARATUS AND SERVICE PROVIDING METHOD

(71) Applicant: SONY CORPORATION, Tokyo (JP)

(72) Inventors: Masahiro Oba, Tokyo (JP); Shunsuke Suzuki, Tokyo (JP); Takashi Matsuo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 139 days.

(21) Appl. No.: 14/909,087

(22) PCT Filed: Jun. 11, 2014

(86) PCT No.: PCT/JP2014/065501
§ 371 (c)(1),
(2) Date: Jan. 29, 2016

(87) PCT Pub. No.: WO2015/015917
PCT Pub. Date: May 2, 2015

(65) Prior Publication Data
US 2016/0182653 A1 Jun. 23, 2016

(30) Foreign Application Priority Data
Jul. 31, 2013 (JP) .................................. 2013-158817

(51) Int. Cl.
*H04L 29/08* (2006.01)
*H04L 12/24* (2006.01)

(52) U.S. Cl.
CPC .......... *H04L 67/16* (2013.01); *H04L 41/0806* (2013.01); *H04L 67/303* (2013.01)

(58) Field of Classification Search
CPC .... H04L 67/16; H04L 67/303; H04L 41/0806
See application file for complete search history.

(56) References Cited

U.S. PATENT DOCUMENTS

| | | | |
|---|---|---|---|
| 2002/0125886 A1* | 9/2002 | Bates | G06F 21/6218 324/307 |
| 2010/0088732 A1* | 4/2010 | Park | H04L 12/2809 725/78 |
| 2011/0047214 A1* | 2/2011 | Lee | H04L 12/2809 709/204 |

* cited by examiner

*Primary Examiner* — Nam T Tran
(74) *Attorney, Agent, or Firm* — Chip Law Group

(57) ABSTRACT

There is provided a service providing apparatus including a determination unit configured to determine a service to be provided for an information processing apparatus based on apparatus-related information acquired from the information processing apparatus, the apparatus-related information including spatial information and function information, the spatial information being related to a space in which a function of the information processing apparatus is extended and being acquired from an external object by the information processing apparatus, the function information indicating the function of the information processing apparatus, and a processing unit configured to execute a process for the service determined to be provided.

13 Claims, 17 Drawing Sheets

FIG. 1

| Name | Description | Data |
|---|---|---|
| Profile Name | DEFINITION OF SPACE AND DEVICE | Meeting Space |
| Location | DESIGNATION | HEAD OFFICE |
| Position | GPS Position | 3XXX.065,14007.YYY |
| Local Name | LOCAL DESIGNATION | CONFERENCE ROOM A |
| Local ID | LOCAL ID | 100 |
| Profile Type | SERVICE TO CALL | Meeting |
| Function1 Name | DEVICE NAME | Projector |
| Function1 Type | FUNCTION TYPE OF DEVICE | Monitor |
| Function1 ID | INFORMATION NECESSARY FOR CONNECTION TO DEVICE | XX:54:4D:32:87:YY |
| Function1 Protocol | PROTOCOL USED FOR CONNECTION TO DEVICE | Wifi |
| Function1 Profile | PROFILE USED FOR CONNECTION TO DEVICE | Miracast |
| Function2 Name | ... | |
| Function2 Type | ... | |
| Function2 ID | ... | |
| ... | | ... |

A: Profile Name through Profile Type
B: Function1 Name through Function1 Type
C: Function1 ID through Function1 Profile

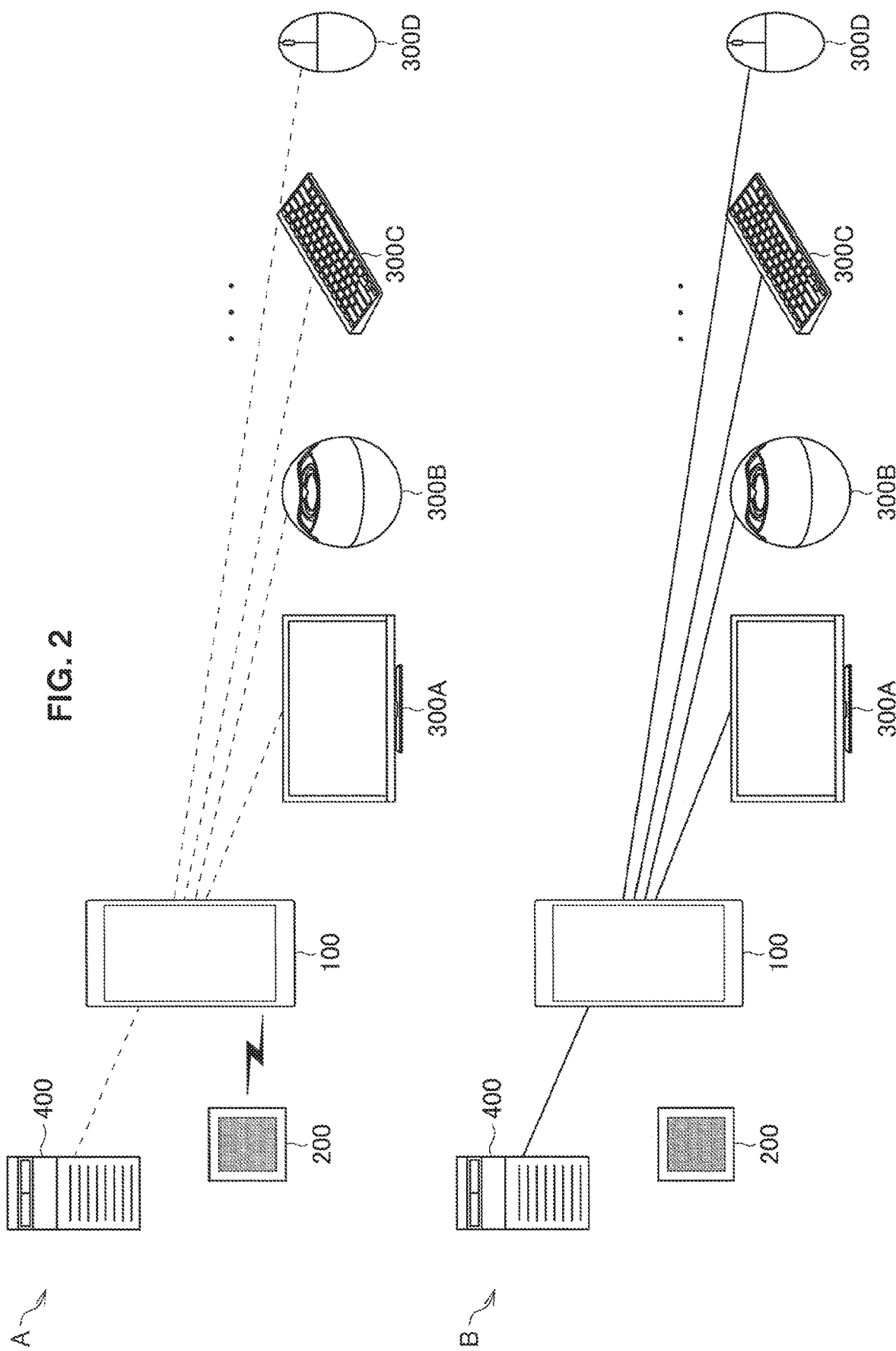

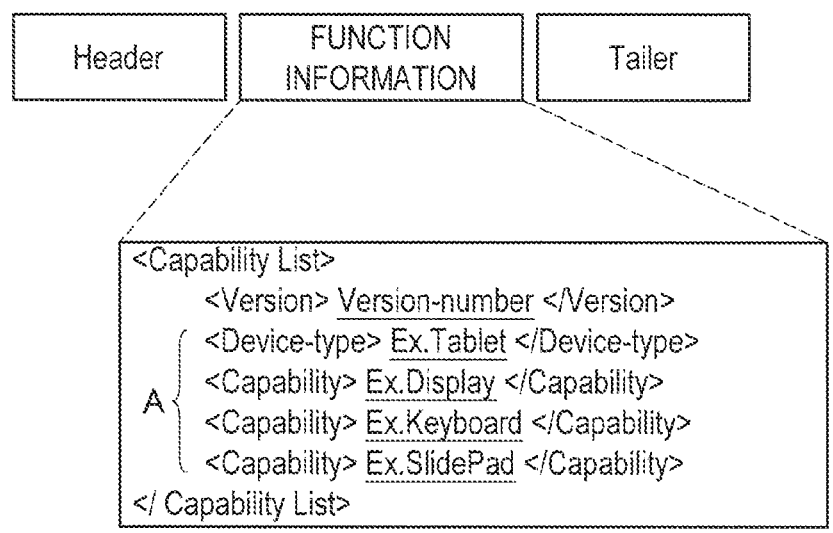

| AVAILABLE DEVICE | FUNCTION | PRIORITY |
|---|---|---|
| DISPLAY | PROJECTION | HIGH |
| Smartphone | VOICE | HIGH |
| | PROJECTION | LOW |
| | INPUT | LOW |
| | VOICE | LOW |
| MOUSE | INPUT | LOW |
| GAME CONTROLLER | INPUT | HIGH |

B:

| AVAILABLE DEVICE | FUNCTION | PRIORITY |
|---|---|---|
| PLAYER | INPUT | HIGH |
| Smartphone | PROJECTION | LOW |
| | INPUT | LOW |
| | VOICE | LOW |
| PROJECTOR | PROJECTION | HIGH |
| 5.1-CH SPEAKER | VOICE | HIGH |

FIG. 6

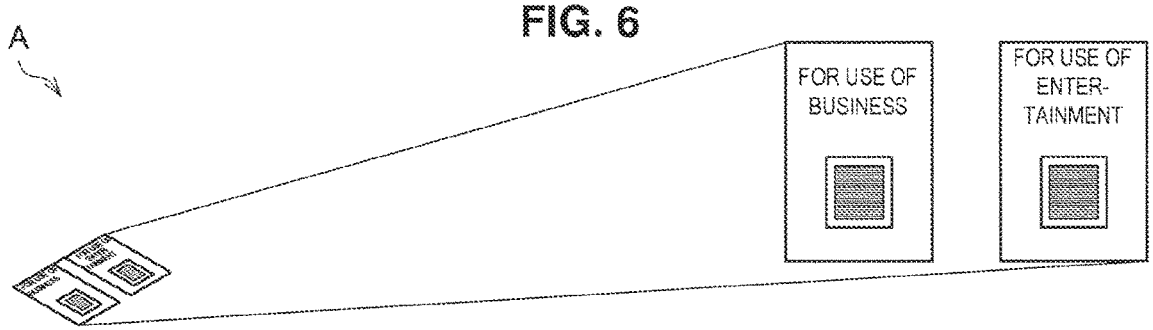

A

B

| SITUATION | BOOTH ID | CONNECTED DEVICE | FUNCTION | PRIORITY |
|---|---|---|---|---|
| BUSINESS | A0001 | DISPLAY | PROJECTION | HIGH |
| | | | VOICE | HIGH |
| | | KEYBOARD | INPUT | HIGH |
| | | GAME CONTROLLER | INPUT | LOW |
| | PERSONAL OWNED DEVICE | SMARTPHONE | INPUT | LOW |
| | | | PROJECTION | LOW |
| | | | VOICE | LOW |

C

| SITUATION | BOOTH ID | CONNECTED DEVICE | FUNCTION | PRIORITY |
|---|---|---|---|---|
| ENTERTAINMENT | A0001 | DISPLAY | PROJECTION | HIGH |
| | | | VOICE | HIGH |
| | | KEYBOARD | INPUT | LOW |
| | | GAME CONTROLLER | INPUT | HIGH |
| | PERSONAL OWNED DEVICE | SMARTPHONE | INPUT | LOW |
| | | | PROJECTION | LOW |
| | | | VOICE | LOW |

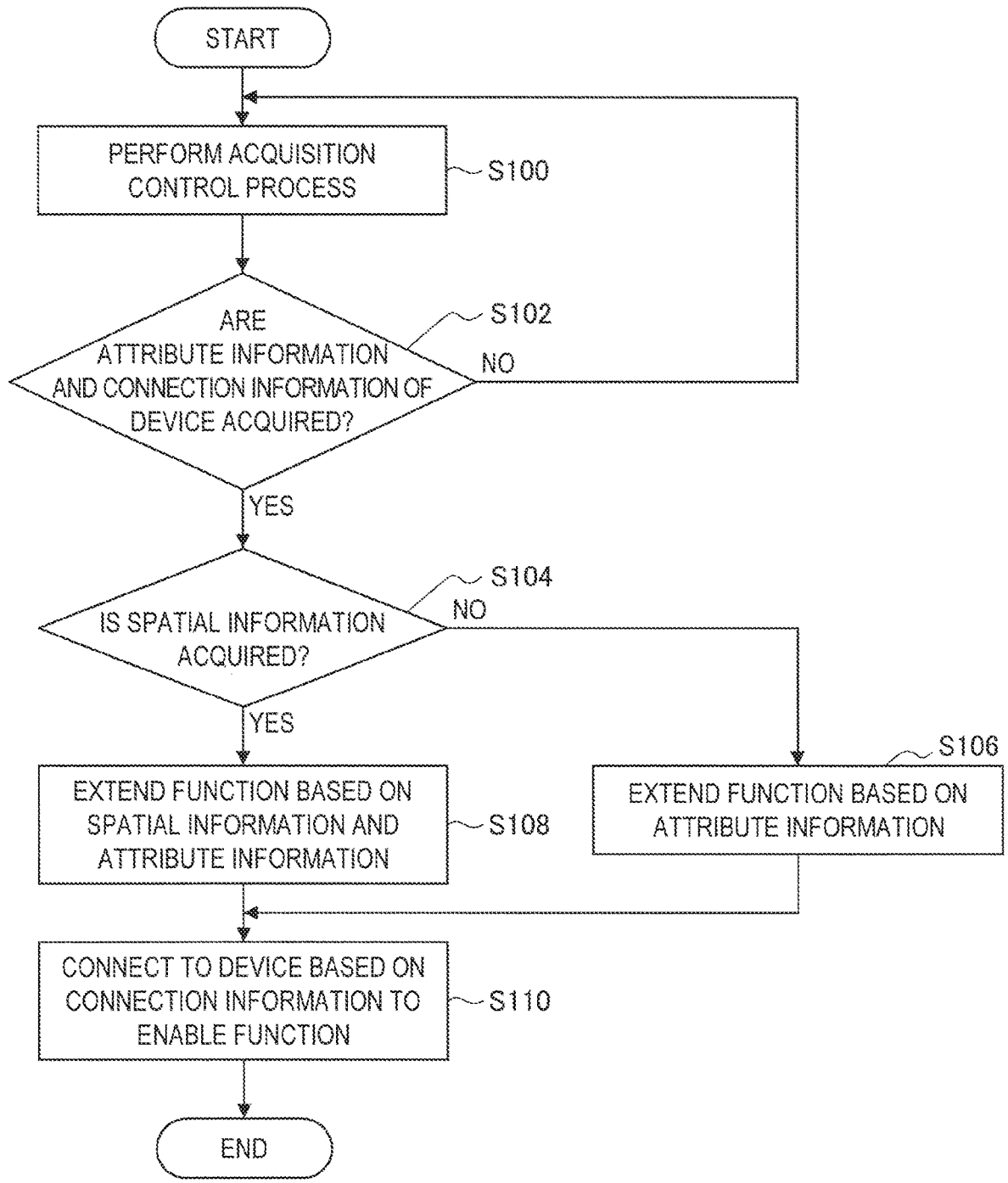

| USER ID | APPARATUS ID |
|---|---|
| 00001 | A |
| 00002 | B |
|  | C |
| 00003 | D |

B ↙

| APPARATUS ID | APPARATUS CLASSIFICATION | AVAILABLE FUNCTION |
|---|---|---|
| A | AOS Smartphone | VOICE COMMUNICATION |
|  |  | E-MAIL |
|  |  | Social Network A |
|  |  | ⋮ |
| B | BOS Smartphone | ⋮ |

SERVICE PROVIDING APPARATUS AND SERVICE PROVIDING METHOD

TECHNICAL FIELD

The present disclosure relates to a service providing apparatus, a service providing method, and a program.

BACKGROUND ART

Techniques that allow information for mutual recognition between devices to be shared between devices are developed. A technique that exchanges information for mutual recognition between devices to be shared between devices is disclosed, for example, in Patent Literature 1 below.

CITATION LIST

Patent Literature

Patent Literature 1: JP 2007-129320A

SUMMARY OF INVENTION

Technical Problem

As an example, when an existing technique that allows information for mutual recognition between devices to be shared between devices is employed, the information for mutual recognition between devices can be shared between devices, and thus processing can be performed in cooperation between devices. However, the above existing technique fails to implement, for example, "extension of a function of an apparatus as if a function of a device outside the apparatus were set as the function of the apparatus".

Thus, even in using the existing technique described above, it will be difficult to provide a service, which corresponds to a space where the function extension is performed using an external device, for an apparatus whose function is extended using the function of the external device.

An embodiment of the present disclosure provides a novel and improved service providing apparatus, service providing method, and program, capable of providing a service, which corresponds to a space where the function extension is performed using an external device, for an information processing apparatus whose function is extended using the function of the external device.

Solution to Problem

According to the present disclosure, there is provided a service providing apparatus including: a determination unit configured to determine a service to be provided for an information processing apparatus based on apparatus-related information acquired from the information processing apparatus, the apparatus-related information including spatial information and function information, the spatial information being related to a space in which a function of the information processing apparatus is extended and being acquired from an external object by the information processing apparatus, the function information indicating the function of the information processing apparatus; and a processing unit configured to execute a process for the service determined to be provided.

According to the present disclosure, there is provided a service providing method executed by a service providing apparatus, the service providing method including: a step of determining a service to be provided for an information processing apparatus based on apparatus-related information acquired from the information processing apparatus, the apparatus-related information including spatial information and function information, the spatial information being related to a space in which a function of the information processing apparatus is extended and the spatial information being acquired from an external object by the information processing apparatus, the function information indicating the function of the information processing apparatus; and a step of executing a process for the service determined to be provided.

According to the present disclosure, there is provided a program for causing a computer to execute: a step of determining a service to be provided for an information processing apparatus based on apparatus-related information acquired from the information processing apparatus, the apparatus-related information including spatial information and function information, the spatial information being related to a space in which a function of the information processing apparatus is extended and being acquired from an external object by the information processing apparatus, the function information indicating the function of the information processing apparatus; and a step of executing a process for the service determined to be provided.

Advantageous Effects of Invention

According to the embodiments of the present disclosure, it is possible to provide a service, which corresponds to a space where the function extension is performed using an external device, for an information processing apparatus whose function is extended using the function of the external device.

Note that the effects described above are not necessarily limited, and along with or instead of the effects, any effect set forth herein or other effects that can be expected from the present specification may be exhibited.

BRIEF DESCRIPTION OF DRAWINGS

FIG. 1 is a diagram illustrated to describe an example of information on function extension according to an embodiment of the present disclosure.

FIG. 2 is a diagram illustrated to describe an example of function extension obtained by performing a process for implementing an information processing method according to the present embodiment.

FIG. 3 is a diagram illustrated to describe an example of function information according to the present embodiment.

FIG. 4 is a diagram illustrated to describe an example of function information according to the present embodiment.

FIG. 5 is a diagram illustrated to describe an exemplary process for implementing the information processing method according to the present embodiment.

FIG. 6 is a diagram illustrated to describe an exemplary process for implementing the information processing method according to the present embodiment.

FIG. 7 is a flowchart illustrating another example of the process for implementing the information processing method according to the present embodiment.

FIG. 9 is a diagram illustrated to describe an example of a process for implementing a service providing method according to an embodiment of the present disclosure.

DESCRIPTION OF EMBODIMENTS

Figure 8:
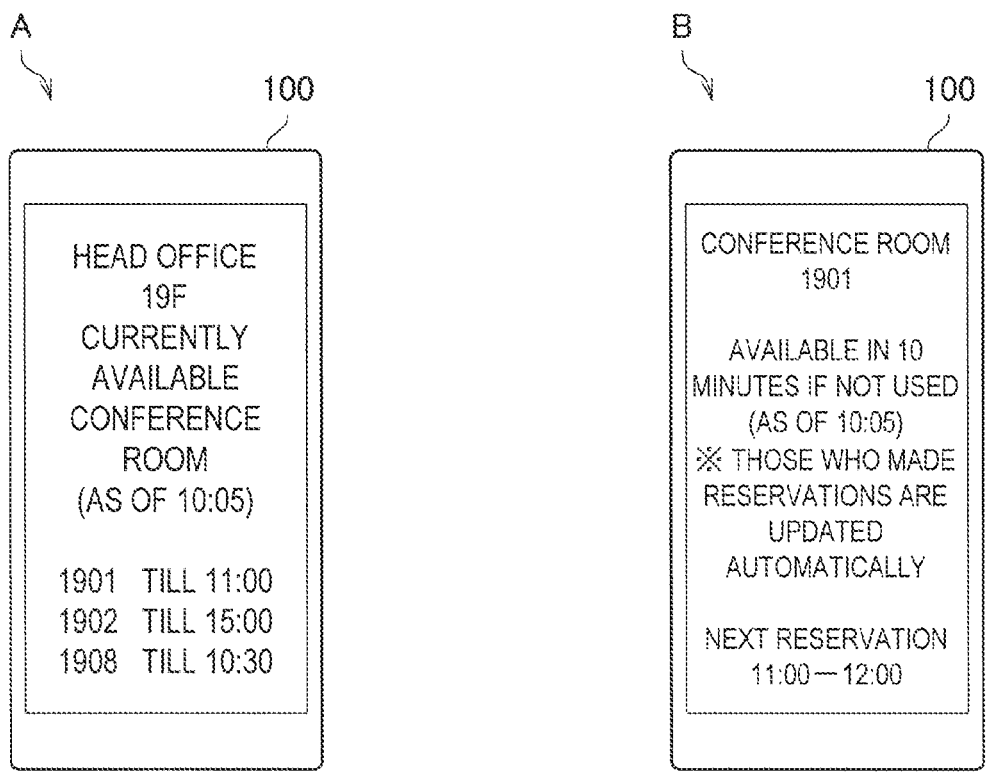
FIG. 8 is a diagram illustrated to describe an example of a service provided by a service providing apparatus according to an embodiment of the present disclosure.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.
1. Information Processing Method according to Embodiment
2. Service Providing Method according to Embodiment
3. Exemplary Process in Information Processing System according to Embodiment
4. Information Processing Apparatus according to Embodiment
5. Service Providing Apparatus according to Embodiment
6. Program according to Embodiment (Information Processing Method According to Embodiment)

A description will be first given of an information processing method according to an embodiment of the present disclosure that allows function extension to be achieved using a function of an external device. The information processing method according to the present embodiment will be described below by taking, as an example, the case where the information processing apparatus according to the present embodiment performs a process for implementing the information processing method according to the present embodiment.

[1] Overview of Process for Implementing Information Processing Method According to Embodiment As described above, the above existing technique fails to implement, for example, "extension of a function of an apparatus as if a function of a device outside the apparatus were set as the function of the apparatus".

Thus, the information processing apparatus according to the present embodiment extends its function using a function of an external device, for example, by performing (1) acquisition control process and (2) function control process, described below.

(1) Acquisition Control Process

The information processing apparatus according to the present embodiment acquires information on the function extension from an external object.

The information on the function extension may include attribute information, connection information, and spatial information. The information on the function extension may be one piece of data in which multiple pieces of information are combined or may be a data group in which each piece of information corresponds to individual data.

The attribute information according to the present embodiment is information (data) that indicates the function of a device. The attribute information according to the present embodiment may be one or more of any type of data capable of indicating the function of a device, including data indicating the name of a device (e.g. category name of a device or product name), data indicating a function type of a device, and data indicating available applications in a device.

The connection information according to the present embodiment is information (data) relating to the connection for establishing communication with a device via wired or wireless. The connection to a device according to the present embodiment may be a state in which communication with a device is possible or may be brought into a state in which communication with a device is possible.

Examples of the connection information according to the present embodiment include one or more pieces of data that are necessary for connection to a device, such as data indicating an address used for connection to a device or an ID and password used for connection to a device. The connection information according to the present embodiment may include data indicating a protocol used for connection to a device or data indicating a profile used for connection to a device.

The spatial information according to the present embodiment is information (data) on the space where the function extension is performed. Examples of the spatial information according to the present embodiment include data indicating a location where an external object is placed. Examples of data indicating a location where an external object is placed include position information directly indicating a position where an external object is placed, such as global positioning system (GPS) data, or data indirectly indicating a position where an external object is placed, such as an ID of the external object.

The spatial information according to the present embodiment is not limited to the data indicating a location where an external object is placed. For example, the spatial information according to the present embodiment may contain any data relating to a space where the function extension is performed, such as data indicating a service to be executed or data indicating the condition of a space where the function extension is performed. Examples of the data indicating the condition of the space where the function extension is performed include data indicating a purpose of using the function in the space where the function extension is performed.

FIG. 1 is a diagram illustrated to describe an example of information on the function extension according to the present embodiment. The portion A of FIG. 1 illustrates an example of the spatial information according to the present embodiment. The portion B of FIG. 1 illustrates an example of the attribute information according to the present embodiment. The portion C of FIG. 1 illustrates an example of the connection information according to the present embodiment.

Examples of the spatial information according to the present embodiment include data indicating a location where an external object is placed ("Definition of Space and Device", "Designation", "GPS Pisition", and "Internal ID" shown in FIG. 1), for example as shown in the portion A of FIG. 1. The spatial information according to the present embodiment may contain data indicating a service to be executed ("Service to Call" shown in FIG. 1) as shown in the portion A of FIG. 1.

The portion A of FIG. 1 illustrates an example in which the data indicating a location where an external object is placed contains position information ("GPS Pisition" shown in FIG. 1) directly indicating a position where the external object is placed. However, the data indicating a location where an external object is placed does not have to contain data directly indicating a position. The data indicating a location where an external object is placed may contain data indirectly indicating a position where the external object is placed, such as an ID of the external object, as described above. It should be understood that examples of the spatial information according to the present embodiment is not limited to the example shown in the portion A of FIG. 1.

Examples of the attribute information according to the present embodiment include data indicating the name of a device ("Name of Device" shown in FIG. 1) and data indicating a function type of a device ("Function Type of Device" shown in FIG. 1), for example as shown in the portion B of FIG. 1.

Examples of the attribute information according to the present embodiment are not limited to the example shown in the portion B of FIG. 1. For example, the attribute information according to the present embodiment may be data indicating an application available in a device. The attribute information according to the present embodiment may contain data indicating an application available in a device.

Examples of the connection information according to the present embodiment include data indicating an address used for connection to a device ("Information Necessary for Connection with Device" shown in FIG. 1), data indicating a protocol used for connection to a device, and data indicating a profile used for connection to a device, for example as shown in the portion C of FIG. 1.

Examples of the connection information according to the present embodiment are not limited to the example shown in the portion C of FIG. 1. The connection information according to the present embodiment may contain an ID such as a service set identifier (SSID) or an authentication key.

For example as shown in FIG. 1, examples of the information on function extension according to the present embodiment include a table (or database) in which contents indicated by the spatial information, contents indicated by the attribute information, and contents indicated by the connection information are all defined. The information on function extension according to the present embodiment may be a data group including individual pieces of the spatial information, the attribute information, and the connection information, as described above. When the information on function extension according to the present embodiment is a data group, examples of the spatial information according to the present embodiment include a table (or database) in which contents indicated by the spatial information are defined. When the information on function extension according to the present embodiment is a data group, examples of the attribute information according to the present embodiment include a table (or database) in which contents indicated by the attribute information are defined. When the information on function extension according to the present embodiment is a data group, examples of the connection information according to the present embodiment include a table (or database) in which contents indicated by the connection information are defined. The information on function extension are not limited to a table (or database), but may be any format of data.

The information on the function extension according to the present embodiment may include the attribute information and connection information that is associated with each of a plurality of devices, as indicated by "Function N" (N is an integer greater than or equal to 1) in FIG. 1. FIG. 1 illustrates an example in which the information on the function extension according to the present embodiment includes the attribute information and connection information that are associated with each of a plurality of devices. However, it should be understood that the information on the function extension according to the present embodiment might include only the attribute information and connection information that are associated with to a single device.

As an example, the attribute information and connection information that are associated with each of a plurality of devices may be included in the information on the function extension according to the present embodiment as shown in FIG. 1. In this case, the information processing apparatus according to the present embodiment may perform a process of item (2) (function control process) described later based on the attribute information and connection information that are associated with each of a plurality of devices. An example of the process based on the attribute information and connection information that are associated with each of a plurality of devices will be described later.

The information on the function extension according to the present embodiment is not limited to the spatial information, the attribute information, and the connection information. For example, the information on the function extension according to the present embodiment may further include release information.

The release information according to the present embodiment is information (data) used to release an extended function. Examples of the release information according to the present embodiment include any format of data that can be used as a trigger for releasing the extended function, such as flag data indicating that the extended function is released.

When the release information is included in the information on the function extension according to the present embodiment, the information processing apparatus according to the present embodiment may perform a process of releasing the extended function in the process of the item (2) (the function control process) described later based on the attribute information and the connection information. An example of the process of releasing the extended function based on the release information according to the present embodiment will be described later.

More specifically, the process of the item (2) (the acquisition control process) will be described. For example, the information processing apparatus according to the present embodiment acquires the information on the function extension according to the present embodiment from an external object by controlling an acquisition device configured to acquire the information on the function extension according to the present embodiment.

Examples of the acquisition device according to the present embodiment include a communication device or an imaging device. The communication device is able to communicate with an external object (when the information on the function extension according to the present embodiment is acquired through communication with an external object). The imaging device captures an image of an external object (when the information on the function extension according to the present embodiment is acquired from an image obtained by capturing an external object). The acquisition device according to the present embodiment may be provided in the information processing apparatus according to the present embodiment or may be an external device connected to the information processing apparatus according to the present embodiment. The following description will be mainly given of an example in which the information processing apparatus according to the present embodiment is provided with the acquisition device according to the present embodiment.

Examples of an external object according to the present embodiment include a device capable of communicating wirelessly with the information processing apparatus according to the present embodiment using a wireless communication technology including near field communication (NFC)-based communication technology or radio frequency identification (RFID) technology, such as an RF tag (transponder), an IC card (transponder), and a reader-writer (interrogator).

When the external object according to the present embodiment is a radio frequency (RF) tag or an integrated circuit (IC) card, the acquisition device according to the present embodiment serves as an interrogator. In this case, for example, the acquisition device according to the present embodiment transmits a carrier wave independently, communicates with an external object according to the present embodiment that is located within a communicable range, and receives the information on the function extension according to the present embodiment, which is transmitted from the external object. The communication of the acquisition device according to the present embodiment with the external object is controlled by the information processing apparatus according to the present embodiment.

As an example, when the external object according to the present embodiment is a reader-writer, the acquisition device according to the present embodiment serves as a transponder. In this case, for example, the acquisition device according to the present embodiment is driven by electric power obtained from the carrier wave transmitted from the external object according to the present embodiment located within a communicable range, communicates with the external object, and receives the information on the function extension according to the present embodiment transmitted from the external object. The communication of the acquisition device according to the present embodiment with the external object is controlled by the information processing apparatus according to the present embodiment.

Examples of the external object according to the present embodiment are not limited to the device capable of communicating wirelessly with the information processing apparatus according to the present embodiment using a wireless communication technology including NFC-based communication technology or RFID technology.

Examples of the external object according to the present embodiment include a communication device capable of communicating with the information processing apparatus according to the present embodiment using any type of communication systems including communication based on signals having voice-frequency band (e.g. signals having frequency band range that can be heard by humans, such as a range of 300 [Hz] to 3400 [Hz]), optical communication that communicates using light such as visible light or infrared rays, communication compliant to IEEE 802.15.1 standard, and communication compliant to IEEE 802.11 standard. When the external object according to the present embodiment is the communication device as described above, examples of the acquisition device according to the present embodiment include a communication device having a communication function corresponding to the communication function included in the external object according to the present embodiment. The communication of the acquisition device according to the present embodiment with the external object is controlled by the information processing apparatus according to the present embodiment.

The external object according to the present embodiment may be a two-dimensional code such as matrix type two-dimensional code or may be a three-dimensional code. When the external object according to the present embodiment is a two-dimensional code or a three-dimensional code, examples of the acquisition device according to the present embodiment include an imaging device that is able to generate an image obtained by capturing the external object according to the present embodiment. The capturing of the external object in the acquisition device according to the present embodiment is controlled by the information processing apparatus according to the present embodiment. The information processing apparatus according to the present embodiment analyzes a code such as two-dimensional code contained in the captured image, and acquires the information on the function extension according to the present embodiment from the code.

The following description will be given of an example in which the external object according to the present embodiment is the communication device capable of communicating wirelessly with the information processing apparatus according to the present embodiment using the wireless communication technology including NFC-based communication technology or RFID technology.

(2) Function Control Process

The information processing apparatus according to the present embodiment extends the functionality of its own apparatus (the information processing apparatus according to the present embodiment, which is similarly applied to the following description) based on the information on the function extension acquired by the process of the above item (1) (the acquisition control process). The information processing apparatus according to the present embodiment connects to a device that corresponds to the extended function based on the acquired information on the function extension, and then enables the extended function. The information processing apparatus according to the present embodiment controls a communication device, such as a communication unit (described later) or an external communication device having the similar function to the communication unit (described later) and allows the communication device to communicate with a device corresponding to the extended function, thereby facilitating the connection to the device corresponding to the extended function.

FIG. 2 is a diagram illustrated to describe an example of function extension obtained by performing a process for implementing the information processing method according to the present embodiment. FIG. 2 illustrates an example in which an information processing apparatus 100 according to the present embodiment is a smartphone. FIG. 2 illustrates an example in which an external object 200 according to the present embodiment is an RF tag. FIG. 2 illustrates an example in which devices (external devices) 300A, 300B, 300C, 300D . . . (hereinafter, a plurality of devices will be collectively referred to as "device 300" or any one device will be referred to as "device 300") are a display (300A in FIG. 2), a speaker (300B in FIG. 2), a keyboard (300C in FIGS. 3 and 4), and a mouse (300D in FIG. 2).

FIG. 2 illustrates an example in which a service providing apparatus 400 according to the present embodiment that provides a predetermined service (described later) through communication with the information processing apparatus according to the present embodiment is a server. The information processing apparatus may communicate with the service providing apparatus according to the present embodiment via a network (or directly) through wireless or wired connections. Examples of the network according to the present embodiment include a wired network such as local area network or wide area network, a wireless network such as wireless local area network (WLAN) or wireless wide area network (WWAN) via a base station, and the Internet using a communication protocol such as transmission control protocol/Internet protocol (TCP/IP).

It should be understood that the information processing apparatus according to the present embodiment, the external object according to the present embodiment, the device according to the present embodiment, and the service providing apparatus according to the present embodiment are not limited to those of the example shown in FIG. 2. The service providing apparatus according to the present embodiment may be a service providing system configured to include a plurality of apparatuses such as a plurality of servers.

The information processing apparatus according to the present embodiment performs the process (the acquisition control process) of the above item (1) and thus acquires the information on the function extension from the external object (the portion A of FIG. 2). The information processing apparatus according to the present embodiment the process (the function control process) of the above item (2), and thus extends the function and connects to a device corresponding to the extended function (the portion B of FIG. 2). In FIG. 2, the state in which the information processing apparatus according to the present embodiment is connected to a device is represented with a solid line, and the state in which the information processing apparatus according to the present embodiment is disconnected from a device is represented with a broken line.

As an example, the connection to a device corresponding to the extended function makes it possible for the information processing apparatus according to the present embodiment to use the function of the connected device as if to be a function of its own apparatus through communication as shown in the portion B of FIG. 3. Thus, the connection of the information processing apparatus according to the present embodiment with a device corresponding to the function extended by the process of item (2) (the function control process) enables the extended function.

As an example, the information processing apparatus according to the present embodiment communicates with the service providing apparatus according to the present embodiment as shown in the portion B of FIG. 2, and thus it is possible to receive and enjoy a predetermined service provided from the service providing apparatus.

The predetermined service provided by the service providing apparatus according to the present embodiment may be various types of services including, a business service (e.g. a service regarding conference management such as conference room reservation, and a service regarding a so-called satellite office), an entertainment service (e.g. a service of providing content data indicating music, image, or the like), a service of providing coupon data, a service of providing software such as game or application, and a service of supporting communication (e.g. a service of providing applications related to communication for a plurality of information processing apparatuses, and a service of controlling communication among a plurality of information processing apparatuses).

The following description will be mainly given of the case in which the predetermined service provided by the service providing apparatus according to the present embodiment is a service regarding conference management and the case in which the predetermined service is a service regarding the satellite office.

Examples of the service regarding conference management according to the present embodiment include various types of services regarding the conference as described below. It should be understood that the service regarding conference management according to the present embodiment is not limited to examples described below.

Securing of conference resources (e.g. conference room reservation linked to participation in a conference room and release of conference room)

Support of conference (e.g. sharing of electronic whiteboard or materials)

Virtual space of conference (e.g. automatic creation and release of conference community by logging in to a conference room)

Support of utilization of results obtained from conference (e.g. provision of business intelligence (BI) function with crossover ability (federated search of conference community) including a cross retrieval of information for conference community or recommendation on matters to be confirmed)

Examples of the service regarding satellite office according to the present embodiment include various types of services as described below. It should be understood that the service regarding satellite office according to the present embodiment is not limited to examples described below.

Service of providing a working environment suitable for the user of the information processing apparatus 100 (e.g. personalization of a device placed in a satellite office by setting the device suitable for the user, or provision of a personal working space of the user (e.g. personal cabinet, personal desktop, and private line))

Service of providing content or data associated with a space indicated by the spatial information The service providing apparatus according to the present embodiment performs the process for implementing the service providing method according to the present embodiment, thereby providing a predetermined service for one or more service providing apparatuses according to the present embodiment.

The process for implementing the service providing method according to the present embodiment in the service providing apparatus according to the present embodiment will be described later. As one example thereof, the service providing apparatus according to the present embodiment allows a processor, such as micro-processing unit (MPU) included in the service providing apparatus, to execute a process relating to a predetermined service, and thus provides the predetermined service. The service providing apparatus according to the present embodiment may be the service providing system configured to include a plurality of apparatuses such as a plurality of servers. In this case, the service providing apparatus according to the present embodiment provides the predetermined service by allowing a processor such as an MPU included in each apparatus to execute the process relating to the predetermined service in cooperation.

An example of the function control process according to the present embodiment will be described in detail.

(2-1) First Example of Function Control Process

The information processing apparatus according to the present embodiment extends the function of its own apparatus, for example, based on the attribute information contained in the information about the extension of the acquired function. The information processing apparatus according to the present embodiment extends the function of its own apparatus, for example, by setting the function indicated by the attribute information as the function of its own apparatus.

The information processing apparatus according to the present embodiment may update the function information according to the present embodiment so that the function information includes the function indicated by the attribute information based on the acquired attribute information, and thus the function of its own apparatus is extended.

When the function of its own apparatus is extended by updating the function information according to the present embodiment, the function information according to the present embodiment including the function indicated by the acquired attribute information allows the function of the information processing apparatus according to the present embodiment to be extended. When the extended function is released, the information processing apparatus according to the present embodiment releases the extended function, for example, by updating the function information according to the present embodiment so that the function information is prevented from including the function indicated by the acquired attribute information.

FIGS. 3 and 4 are diagrams illustrating an example of function information according to the present embodiment. FIG. 3 illustrates an example of function information in which information is defined using a tag. The portion A shown in FIG. 3 illustrates an example of a format in which a function corresponding to any one device (the information processing apparatus according to the present embodiment or an external device) is defined in the function information according to the present embodiment. FIG. 4 illustrates an example of the function information in which functions are defined in a table format (or database format).

When the function is defined in the function information according to the present embodiment using a tag, the function may be defined in the function information using a tag "Capability" shown in FIG. 3. In the function information, it is possible to define functions of a plurality of devices, for example, by defining a plurality of functions using a format as shown in the portion A of FIG. 3.

In the function information according to the present embodiment, a function may be defined using a tag. In this case, the information processing apparatus according to the present embodiment adds the attribute information acquired by the process of the above item (1) (the acquisition control process) to the function information in the format as shown in the portion A of FIG. 3, and thus a function of its own apparatus is added. For example, the data corresponding to "Name of Device" shown in the portion B of FIG. 1 corresponds to "Device-type" shown in the portion A of FIG. 5, and the data corresponding to "Function Type of Device" shown in the portion B of FIG. 1 corresponds to "Capability" shown in the portion A of FIG. 3.

When functions are defined in the function information according to the present embodiment in a table format (or database format), the function is defined in the function information, for example, by registering the function as "Available Function" shown in FIG. 4.

In the function information according to the present embodiment, a function is defined in a table format (or database format). In this case, the information processing apparatus according to the present embodiment may update the table (or database) as shown in FIG. 4 based on the attribute information acquired by the process of the above item (1) (the acquisition control process), and thus a function of its own apparatus is added. The information processing apparatus according to the present embodiment may add contents of the acquired attribute information to "Device Classification" and "Available Function" shown in FIG. 4, and thus a function of its own apparatus is added. For example, the data corresponding to "Name of Device" shown in the portion B of FIG. 1 corresponds to "Device Classification" shown in FIG. 4, and the data corresponding to "Function Type of Device" shown in the portion B of FIG. 1 corresponds to "Available Function" shown in FIG. 4.

The information processing apparatus according to the present embodiment may update the attribute information as shown in FIG. 3 or 4 to include the function indicated by the attribute information based on the attribute information acquired by the process of the above item (1) (the acquisition control process), and thus the function of its own apparatus is extended. The attribute information according to the present embodiment is not limited to that of the example shown in FIG. 3 or 4. For example, in the function information according to the present embodiment, the function originally owned by the information processing apparatus according to the present embodiment (the function originally owned before the extension) may be distinguished explicitly from the added function (extended function).

The process for the function extension in the information processing apparatus according to the present embodiment is not limited to the above example.

For example, the information processing apparatus according to the present embodiment may associate the function information according to the present embodiment with the acquired attribute information to extend the function of its own apparatus. The information processing apparatus according to the present embodiment can associate the function information according to the present embodiment with the acquired attribute information using any method capable of an association of the function information with the attribute information, such as an association of the function information with the attribute information using a relational database.

When the function of the information processing apparatus according to the present embodiment is extended, the function information may be associated with the attribute information. This association of the function information according to the present embodiment with the acquired attribute information allows the function of the information processing apparatus according to the present embodiment to be extended. When the extended function is released, the information processing apparatus according to the present embodiment may release the association of the function information with the attribute information by updating a relational database and the like, and thus the extended function is released.

As an example, when the function of its own apparatus is extended as described above, the information processing apparatus according to the present embodiment connects to a device corresponding to the extended function based on the connection information included in the acquired information on the function extension, thus the extended function is enabled.

The connection to a device corresponding to the extended function makes it possible for the information processing apparatus according to the present embodiment to use the function of the connected device as if to be a function of its own apparatus through communication. Thus, the connection of the information processing apparatus according to the present embodiment with a device corresponding to the function extended by the process of item (2) (the function control process) enables the extended function.

(2-2) Second Example of Function Control Process

As described above, the attribute information and connection information corresponding to each of a plurality of devices may be included in the information on the function extension according to the present embodiment, which is acquired by the process of the above item (1) (the acquisition control process). The attribute information and connection information corresponding to each of a plurality of devices may be included in the information on the function extension according to the present embodiment, which is acquired by the process of the above item (1) (the acquisition control process). In this case, the information processing apparatus according to the present embodiment extends the function of its own apparatus based on the acquired plurality of attribute information. The information processing apparatus according to the present embodiment connects to each of the devices corresponding to the extended function based on the acquired plurality of connection information, and thus the extended function is enabled.

When the function control process according to the second example is performed, the information processing apparatus according to the present embodiment may extend the function of its own apparatus by setting the functions of the plurality of devices collectively as the function of its own apparatus, and thus the extended function is enabled.

(2-2-1) Example of Process for Function Extension in Function Control Process According to Second Example The information processing apparatus according to the present embodiment may perform a process on each of the acquired plurality of attribute information, which is similar to the function control process according to the first example described above, and thus the function of its own apparatus is extended. For example, when the process similar to the function control process according to the first example described above is performed on each of the acquired plurality of attribute information, the information processing apparatus according to the present embodiment has the function of a device corresponding to each of the acquired plurality of attribute information. In other words, the information processing apparatus according to the present embodiment may set the function indicated by each of the acquired plurality of attribute information as the function of its own apparatus, and thus the function of its own apparatus is extended.

(2-2-2) Another Example of Process for Function Extension in Function Control Process According to Second Example For example, functions indicated by the acquired plurality of attribute information may include an overlapping function between devices functions indicated by the acquired plurality of attribute information. When functions indicated by the acquired plurality of attribute information include an overlapping function between devices, the information processing apparatus according to the present embodiment may determine a device to be used for the function extension among from devices corresponding to overlapping functions and selectively extend the function of the determined device as the function of its own apparatus.

More specifically, when functions indicated by the acquired plurality of attribute information include an overlapping function between devices, the information processing apparatus according to the present embodiment may set a priority level for each of the overlapping functions.

The information processing apparatus according to the present embodiment may estimate the situation in which an external device is used based on the devices corresponding to the acquired plurality of attribute information, and may set the priority level depending on the estimated result.

FIG. 5 is a diagram illustrated to describe an exemplary process for implementing the information processing method according to the present embodiment. The portions A and B shown in FIG. 5 illustrate an example of the case where the information processing apparatus according to the present embodiment sets a priority level for the acquired attribute information. The columns "Available Device" and "Function" illustrated in FIG. 5 correspond to the attribute information according to the present embodiment.

FIG. 5 illustrates an example in which the information processing apparatus according to the present embodiment records the priority level that is set for each function indicated by the attribute information in the attribute information and thus directly associates each function indicated by the attribute information with the set priority level. The method of associating each function indicated by the attribute information with the priority level in the information processing apparatus according to the present embodiment is not limited to the above example. For example, the information processing apparatus according to the present embodiment can associate each function indicated by the attribute information with the priority level using any method capable of associating each function indicated by the attribute information with the set priority level.

In FIG. 5, although the priority is represented in two levels of "High" and "Low", the priority according to the present embodiment may be represented in three or more levels.

(A) Setting Example 1 of Priority Level in Function Control Process According to Second Example When the attribute information shown in the portion A of FIG. 7 is acquired, functions "Projection", "Audio", and "Input" are overlapping. The information processing apparatus according to the present embodiment estimates that it is in the situation where a game is played from a game controller included in the attribute information. The information processing apparatus according to the present embodiment sets the priority level of a display that is considered to have a larger screen to be higher, among devices corresponding to the function "Projection", based on the result obtained from the situation estimation. The information processing apparatus according to the present embodiment sets the priority level of a display that is considered to be able to output higher quality sound to be higher, among devices corresponding to the function "Audio", based on the result obtained from the situation estimation. The information processing apparatus according to the present embodiment sets the priority level of a game controller that is more suitable for operations of the game to be higher, among devices corresponding to the function "Input", based on the result obtained from the situation estimation.

(B) Setting Example 2 of Priority Level in Function Control Process According to Second Example When the attribute information shown in the portion B of FIG. 7 is acquired, functions "Projection", "Audio", and "Input" are overlapping. The information processing apparatus according to the present embodiment estimates that it is in the situation where the user views an image and audio from a projector or player contained in the attribute information. The information processing apparatus according to the present embodiment sets the priority level of a projector that is considered to be able to display the image on a larger screen to be higher, among devices corresponding to the function "Projection", based on the result obtained from the situation estimation. The information processing apparatus according to the present embodiment sets the priority level of a 5.1 channel speaker that is considered to be able to output higher quality sound to be higher, among devices corresponding to the function "Audio", based on the result obtained from the situation estimation. The information processing apparatus according to the present embodiment sets the priority level of a player that is more suitable for operation related to the playback of an image to be higher, among devices corresponding to the function "Input", based on the result obtained from the situation estimation.

The information processing apparatus according to the present embodiment may set the priority level by estimating the situation of using an external device, as the example shown in the above items (A) and (B).

The process of setting the priority level in the information processing apparatus according to the present embodiment is not limited to the above example. For example, the information processing apparatus according to the present embodiment may set the priority level based on the situation of using an external device, which is set based on the user operation.

When the priority level for each of the overlapping functions is set, the information processing apparatus according to the present embodiment determines attribute information that is to be used for the extension of the overlapping function based on the set priority level.

The information processing apparatus according to the present embodiment may select one or more devices having the highest priority level for each of the overlapping functions, and may set the attribute information corresponding to the selected device as the attribute information used in extending the overlapping function. The information processing apparatus according to the present embodiment may select the set number of devices in descending order of the priority levels for each of the overlapping functions, and may set the attribute information corresponding to the selected device as the attribute information used in extending the overlapping function. The number to be set may be a fixed value that is set in advance, or may be a variable value that is capable of setting as appropriate based on the user operation or the like.

When the attribute information to be used in extending the overlapping function is determined, the information processing apparatus according to the present embodiment may set the function indicated by the determined attribute information and the function that does not overlap between devices as the function of its own apparatus, and thus the function of its own apparatus is extended. The information processing apparatus according to the present embodiment may extend the function of its own apparatus by the process similar to the function control process according to the first example described above based on the determined attribute information and the attribute information corresponding to the function that does not overlap between devices.

(2-3) Third Example of Function Control Process

As described above, the information on the function extension according to the present embodiment acquired by the process of the above item (1) (the acquisition control process) may include the spatial information. When the information on the function extension according to the present embodiment acquired by the process of the above item (1) (the acquisition control process) includes the spatial information, the information processing apparatus according to the present embodiment determines a device that corresponds to the function to be extended based on the acquired spatial information and attribute information. The information processing apparatus according to the present embodiment may extend the function of its own apparatus based on the attribute information corresponding to the determined device, in a similar process to the function control process according to the first example and the function control process according to the second example. The information processing apparatus may set the function indicated by the attribute information corresponding to the determined device as the function of its own apparatus in a similar process to the function control process according to the first example, and thus the function of its own apparatus is extended. The information processing apparatus according to the present embodiment connects to each of the devices corresponding to the extended function based on the acquired plurality of connection information, and thus the extended function is enabled.

(2-3-1) Example of Process for Function Extension in Function Control Process According to Third Example When there is no function overlapping between devices among functions indicated by each of the acquired plurality of attribute information, the information processing apparatus according to the present embodiment extends the function of its own apparatus in a similar way to the exemplary process for the function extension described in the above item (2-2-1). In other words, when there is no function overlapping between devices among functions indicated by each of the acquired plurality of attribute information, the information processing apparatus according to the present embodiment has the function of a device corresponding to each of the acquired attribute information.

(2-3-2) Another Example of Process for Function Extension in Function Control Process According to Third Example When functions indicated by each of the acquired plurality of attribute information include an overlapping function between devices, the information processing apparatus according to the present embodiment may determine a device to be used for the function extension among devices corresponding to the overlapping functions based on the acquired spatial information and attribute information. The information processing apparatus selectively extends the function of the determined device by setting it as the function of its own apparatus.

More specifically, when functions indicated by each of the acquired plurality of attribute information include an overlapping function between devices, the information processing apparatus according to the present embodiment may set the priority level for each of the overlapping functions based on the spatial information and attribute information.

The information processing apparatus according to the present embodiment may determine the situation in which an external device is used based on the spatial information and may set the priority level depending on the determined situation.

FIG. 6 is a diagram illustrated to describe an exemplary process for implementing the information processing method according to the present embodiment. The portion A shown in FIG. 6 illustrates an example of an external object from which the information on the function extension according to the present embodiment including the spatial information is acquired.

The portion A shown in FIG. 6 illustrates an external object in which the condition of a space where the function extension is performed is "business" (an RF tag "For Use of Business" shown in the portion A of FIG. 6), and an external object in which the condition of a space where the function extension is performed is "entertainment" (an RF tag "For Use of Entertainment" shown in the portion A of FIG. 6).

The portions B and C shown in FIG. 6 illustrate an example of a case where the information processing apparatus according to the present embodiment sets the priority level for the acquired attribute information. The "Situation" shown in the portions B and C of FIG. 6 is an example of data indicating the condition of a space where the function extension is performed, and corresponds to the spatial information according to the present embodiment. The "Connected Device" and "Function" shown in the portions B and C of FIG. 6 correspond to the attribute information according to the present embodiment. Although not shown in the portions B and C of FIG. 6, the spatial information according to the present embodiment contains data indicating a location where an external object is placed, for example as shown in the portion A of FIG. 1.

The portions B and C of FIG. 6 illustrate an example in which the information processing apparatus according to the present embodiment records the priority level that is set for each function indicated by the attribute information in the attribute information and thus directly associates each function indicated by the attribute information with the set priority level, which is similar to FIG. 5. It should be understood that the method of associating each function indicated by the attribute information with the priority level in the information processing apparatus according to the present embodiment is not limited to the above example. In the portions B and C of FIG. 6, although the priority is represented in two levels of "High" and "Low", which is similar to FIG. 5, the priority according to the present embodiment may be represented in three or more levels.

(a) Setting Example 1 of Priority Level in Function Control Process According to Third Example When the spatial information and attribute information shown in the portion B of FIG. 6 are acquired, functions "Projection", "Audio", and "Input" are overlapping. The information processing apparatus according to the present embodiment determines that it is in the situation where the work on business is performed based on the spatial information. The information processing apparatus according to the present embodiment sets the priority level of a display that is considered to have a larger screen to be higher, among devices corresponding to the function "Projection", based on the determined situation. The information processing apparatus according to the present embodiment sets the priority level of a display that is considered to be able to output higher quality sound to be higher, among devices corresponding to the function "Audio", based on the determined situation. The information processing apparatus according to the present embodiment sets the priority level of a keyboard that is more suitable for the work on business to be higher, among devices corresponding to the function "Input", based on the determined situation.

(b) Setting Example 3 of Priority Level in Function Control Process According to Third Example When the spatial information and attribute information shown in the portion C of FIG. 6 are acquired, functions "Projection", "Audio", and "Input" are overlapping. The information processing apparatus according to the present embodiment determines that it is in the situation where the work on entertainment is performed based on the spatial information. The information processing apparatus according to the present embodiment sets the priority level of a display that is considered to have a larger screen to be higher, among devices corresponding to the function "Projection", based on the determined situation. The information processing apparatus according to the present embodiment sets the priority level of a display that is considered to be able to output higher quality sound to be higher, among devices corresponding to the function "Audio", based on the determined situation. In addition, the information processing apparatus according to the present embodiment sets the priority level of a game controller that is more suitable for operation of entertainment such as a game to be higher, among devices corresponding to the function "Input", based on the determined situation.

The information processing apparatus according to the present embodiment may set the priority level by determining the situation of using an external device, as the example shown in the above items (a) and (b).

The method of determining a situation in which an external device is used based on the spatial information in the information processing apparatus according to the present embodiment is not limited to that of using the data indicating the condition of a space where the function extension is performed, as "Situation" shown in the portions B and C of FIG. 6.

For example, it is also possible for the information processing apparatus according to the present embodiment to determine a situation in which an external device is used based on data indicating a location where the external object is placed as shown in the portion A of FIG. 1. Taking an example of using the spatial information shown in the portion A of FIG. 1, the information processing apparatus according to the present embodiment determines the situation in which a task regarding business is carried out based on "Meeting Space" that is contents indicated by "Definition of Space and Device" or "Meeting" that is contents indicated by "Service to Call", as shown in the portion A of FIG. 1. The information processing apparatus according to the present embodiment may determine a situation using a table or the like in which a position where an external object is placed is associated with the situation and using the position at which the external object is placed, which is indicated by "GPS Position" shown in the portion A of FIG. 1.

When the priority level for each of the overlapping functions is set, the information processing apparatus according to the present embodiment may determine the attribute information to be used in extending the overlapping function based on the set priority level. The information processing apparatus according to the present embodiment may determine the attribute information to be used in extending the overlapping function, for example, in a similar way to the function control process according to the second example described in the above item (2-2).

When the attribute information to be used in extending the overlapping function, the information processing apparatus according to the present embodiment may set the function indicated by the determined attribute information and the function that does not overlap between devices as the function of its own apparatus, and thus the function of its own apparatus is extended. The information processing apparatus according to the present embodiment may extend the function of its own apparatus, for example, in a similar way to the function control process according to the second example described in the above item (2-2).

The information processing apparatus according to the present embodiment may perform any of function control processes described in the first to third examples. Thus, the information processing apparatus extends the function of its own apparatus, connects to a device corresponding to the extended function, and enables the extended function.

The function control process according to the present embodiment is not limited to the function control processes described in the first to third examples.

(2-4) Fourth Example of Function Control Process

As an example, the information processing apparatus according to the present embodiment communicates with the service providing apparatus according to the present embodiment as shown in FIG. 2, and thus it is possible to receive and enjoy a predetermined service provided from the service providing apparatus.

The information processing apparatus according to the present embodiment, when the predetermined service described above is received and used, may transmit the apparatus-related information to the service providing apparatus according to the present embodiment. For example, the information processing apparatus according to the present embodiment controls a communication device capable of communicating with the service providing apparatus according to the present embodiment so that the communication device transmits the spatial information and the function information, thereby transmitting the function information and the identification information to the service providing apparatus according to the present embodiment.

The apparatus-related information according to the present embodiment may contain the spatial information acquired from an external object and the function information according to the present embodiment indicating the function being enabled. The apparatus-related information according to the present embodiment may be one piece of data in which multiple pieces of information are combined or may be a data group in which each piece of information corresponds to individual data.

The communication device capable of communicating with the service providing apparatus according to the present embodiment may be provided in the information processing apparatus according to the present embodiment, or may be an external device connected to the information processing apparatus according to the present embodiment. The communication device capable of communicating with the service providing apparatus may be a communication device that serves as an acquisition device according to the present embodiment or may be a different communication device.

The information contained in the apparatus-related information transmitted to the service providing apparatus by the information processing apparatus according to the present embodiment is not limited to the spatial information and the function information.

For example, the information processing apparatus according to the present embodiment may transmit the apparatus-related information, which further contains identification information that allows its own apparatus to be identified, to the service providing apparatus.

Examples of the identification information according to the present embodiment include an ID that indicates the information processing apparatus according to the present embodiment. The identification information according to the present embodiment may be any format of data capable of identifying the information processing apparatus according to the present embodiment.

The information processing apparatus according to the present embodiment can transmit the apparatus-related information as described above to the service providing apparatus according to the present embodiment. Thus, the service providing apparatus according to the present embodiment performs the process for implementing the service providing method according to the present embodiment described later based on the apparatus-related information.

The information processing apparatus according to the present embodiment performs a process using the function being enabled, for example based on service information on service transmitted from the service providing apparatus according to the present embodiment.

(2-5) Fifth Example of Function Control Process

As described above, the information on the function extension according to the present embodiment that is acquired by performing the process of the above item (1) (the acquisition control process) may contain the release information. When the information on the function extension according to the present embodiment that is acquired by performing the process of the above item (1) (the acquisition control process) contains the release information, the information processing apparatus according to the present embodiment may terminate the connection to the device corresponding to the extended function based on the acquired connection information. Then, the information processing apparatus according to the present embodiment may delete the function indicated by the attribute information from the function of its own apparatus.

The termination of the connection to the device corresponding to the extended function prevents the information processing apparatus according to the present embodiment from using the function of the connected device as the function of its own apparatus through communication. The information processing apparatus according to the present embodiment may delete the function indicated by the attribute information from the function of its own apparatus, and thus the function of the information processing apparatus according to the present embodiment returns to the state before extension. The information processing apparatus according to the present embodiment terminates the connection to the device corresponding to the function being extended and deletes the function indicated by the attribute information from the function of its own apparatus, thus it is possible to disable the extended function. Disabling the extended function according to the present embodiment may be performed, for example, by terminating the connection to the device corresponding to the extended function, i.e., by preventing the function of the connected device from being used as the function of its own apparatus through communication.

The information processing apparatus may delete data corresponding to the added function from the function information in which the update for function addition is performed, and thus the function indicated by the attribute information is deleted from the function of its own apparatus. The information processing apparatus according to the present embodiment may update a relational database and the like and may release the association between the function information and the attribute information, and thus the function indicated by the attribute information may be deleted from the function of its own apparatus. When the function indicated by the attribute information is deleted from the function of its own apparatus, the information processing apparatus according to the present embodiment may delete the attribute information corresponding to the function to be deleted.

(2-6) Sixth Example of Function Control Process

The information processing apparatus according to the present embodiment can also perform, as a function control process, a process obtained by combining one or more of the function control processes described in the first to third examples and one or both of the function control processes described in the fourth and fifth examples.

The information processing apparatus according to the present embodiment may perform, as a function control process, any one of the function control processes described in the first to sixth examples. It should be understood that the function control process according to the present embodiment is not limited to the first to sixth examples.

The information processing apparatus according to the present embodiment may perform the process of the above item (1) (the acquisition control process) and the process of the above item (2) (the function control process) as a process for implementing the information processing method according to the present embodiment.

The information processing apparatus according to the present embodiment may extend the function of its own apparatus based on the attribute information acquired by the process of the above item (1) (the acquisition control process) in the process of the above item (2) (the function control process). This extension is performed by setting the function indicated by the attribute information as the function of its own apparatus. The information processing apparatus according to the present embodiment may connect to a device corresponding to the extended function based on the connection information acquired by the process of the above item (1) (the acquisition control process) in the process of the above item (2) (the function control process), and thus the extended function is enabled.

Consequently, the process of the above item (1) (acquisition control process) and the process of the above item (2) (function control process) performed by the information processing apparatus according to the present embodiment, as the process for implementing the information processing method according to the present embodiment make it possible to extend its function using a function of an external device.

The information on function extension may be acquired from the external object by wireless communication using a wireless communication technology including NFC-based communication technology or RFID technology in the process of the above item (1) (acquisition control process). In this case, the user can extend the function of the information processing apparatus according to the present embodiment by bringing the acquisition device according to the present embodiment into contact with the external object. The touch operation according to the present embodiment may be an operation in which the distance between the acquisition device according to the present embodiment and the external object is within the range capable of communication by a wireless communication technology including NFC-based communication technology or RFID technology.

Thus, when the information on the function extension is acquired from the external object using a wireless communication technology such as NFC-based communication technology in the process of the above item (1) (the acquisition control process), the function extension can be achieved by the user through a simple operation, thereby further improving the convenience of the user.

The information on the function extension may be acquired from the external object using a wireless communication technology such as NFC-based communication technology in the process of the above item (1) (the acquisition control process). In this case, it is possible for the user to receive and enjoy the service that is achievable by the extended function and to utilize a tool that is achievable by the extended function, through the action of an intuitive touch operation in which a manual is unnecessary.

When the information on the function extension that is acquired by performing the process of the above item (1) (the acquisition control process) includes the spatial information, the information processing apparatus according to the present embodiment can extend the function of its own apparatus based on the acquired spatial information in the process of the above item (2) (the function control process). The function extension based on the spatial information can be regarded as a logging in to a space (or a condition in the space). Thus, the information on the function extension according to the present embodiment including the spatial information allows the user to receive and enjoy a service that is achievable by the function extended based on the spatial information and is corresponded to the place. The user also can utilize a tool that is achievable by the function extended based on the spatial information and is corresponded to the place.

The information processing apparatus according to the present embodiment may transmit the apparatus-related information to the service providing apparatus in the process of the above item (2) (function control process). The service providing apparatus performs a process for implementing the service providing method according to the present embodiment described later, based on the acquired apparatus-related information. The information processing apparatus according to the present embodiment performs a process using the enabled function based on the service information transmitted from the service providing apparatus. Thus, it is possible for the user to receive and enjoy the service that is achievable by the extended function.

[2] Process for Implementing Information Processing Method According to Embodiment A detailed example of the process for implementing the information processing method according to the present embodiment described above will be described.

FIG. 7 is a flowchart illustrating another example of the process for implementing the information processing method according to the present embodiment. The process in step S100 of FIG. 7 corresponds to the process of the above item (1) (acquisition control process). The process in steps S106 to S110 corresponds to the process of the above item (2) (function control process).

The information processing apparatus according to the present embodiment performs the acquisition control process (S100). The information processing apparatus according to the present embodiment starts the acquisition control process, for example, using a predetermined user operation including a touch operation on an external object and an imaging operation to capture an image of an external object as a trigger. However, the trigger to start the acquisition control process is not limited thereto. For example, when an external object is a reader-writer, the information processing apparatus according to the present embodiment may start the acquisition control process by using the detection of a signal (e.g. a polling signal) related to a carrier wave transmitted from the external object as a trigger.

When the process in step S100 is performed, the information processing apparatus according to the present embodiment determines whether the attribute information and the connection information (an example of information on the function extension) of the device are acquired (S102).

If it is not determined in step S102 that the attribute information and the connection information are acquired, the information processing apparatus according to the present embodiment may repeat the process from step S100.

If it is determined in step S102 that the attribute information and the connection information are acquired, the information processing apparatus according to the present embodiment determines whether the spatial information (an example of information on function extension) is acquired (S104).

If it is not determined in step S104 that the spatial information is acquired, the information processing apparatus according to the present embodiment extends the function, for example, based on the attribute information acquired by the process in step S100 (S106). The information processing apparatus according to the present embodiment performs, for example, the process for the function extension in step S104 as described in the item (2-2-1) or (2-2-2).

If it is determined in step S104 that the spatial information is acquired, the information processing apparatus according to the present embodiment extends the function based on the spatial information and the attribute information acquired by the process in step S100 (S108). The information processing apparatus according to the present embodiment performs the process for function extension, for example, as described in the above item (2-3-1) or (2-3-2), in step S108.

If the function is extended in step S106 or S108, the information processing apparatus according to the present embodiment connects to a device corresponding to the extended function to enable the extended function, for example based on the connection information acquired by the process in step S100 (S110).

The information processing apparatus according to the present embodiment performs, for example, the process shown in FIG. 7, as the process for implementing the information processing method according to the present embodiment. For example, when the process shown in FIG. 7 is performed, the process of the above item (1) (acquisition control process) and the process of the above item (2) (playback control process) are achieved. Thus, the information processing apparatus according to the present embodiment can extend the function using a function of an external device, for example by performing the process shown in FIG. 7.

It should be understood that the process for implementing the information processing method according to the present embodiment is not limited to that shown in FIG. 7.

(Service Providing Method According to Embodiment)

The service providing method according to the present embodiment that allows a service to be provided for one or more information processing apparatuses according to the present embodiment will be described. The following description will be given of the service providing method according to the present embodiment by taking as an example the case in which the service providing apparatus according to the present embodiment performs the process for implementing the service providing method according to the present embodiment.

[1] Overview of Process for Implementing Service Providing Method According to Embodiment The service providing apparatus according to the present embodiment provides a service for one or more information processing apparatuses according to the present embodiment, for example by performing a determination process of the item (I) and an execution process of the item (II), which will be described below.

(I) Determination Process

The service providing apparatus according to the present embodiment determines one or more services to be provided for the information processing apparatus according to the present embodiment based on the apparatus-related information acquired from the information processing apparatus. The apparatus-related information according to the present embodiment may be transmitted from information processing apparatus according to the present embodiment as described above.

The apparatus-related information according to the present embodiment acquired by the service providing apparatus according to the present embodiment may contain the spatial information acquired from an external object by the information processing apparatus according to the present embodiment and the function information. The apparatus-related information according to the present embodiment may further contain the identification information.

(I-1) First Example of Determination Process

The service providing apparatus according to the present embodiment determines a service to be provided for the information processing apparatus based on the acquired spatial information and the function of the information processing apparatus indicated by the acquired function information.

The service providing apparatus according to the present embodiment can specify the function of the information processing apparatus according to the present embodiment using the function indicated by the acquired function information. The service providing apparatus according to the present embodiment can determine a situation in which the information processing apparatus is used, for example by performing a process similar to the process for determination of a situation in which an external device is used in the information processing apparatus according to the present embodiment as described above, based on the acquired spatial information.

Thus, the service providing apparatus according to the present embodiment can provide a service, which corresponds to the situation in which the information processing apparatus is used and is determined based on the acquired spatial information, for the information processing apparatus according to the present embodiment within a range of the function of the information processing apparatus according to the present embodiment by performing the determination process according to the first example.

The service to be provided by the service providing apparatus according to the present embodiment may be various types of services including, a business service (e.g. a service regarding conference management such as conference room reservation, and a service regarding a so-called satellite office), an entertainment service (e.g. a service of providing content data indicating music, image, or the like), a service of providing coupon data, a service of providing software such as game or application, and a service of supporting communication (e.g. a service of providing applications related to communication for a plurality of information processing apparatuses, and a service of controlling communication among a plurality of information processing apparatuses).

FIG. 8 is a diagram illustrated to describe an example of a service provided by the service providing apparatus according to the present embodiment. FIG. 8 illustrates an example in which an information processing apparatus 100 according to the present embodiment is a smartphone, similarly to FIG. 2. FIG. 8 illustrates an example of the case in which the service providing apparatus according to the present embodiment provides a conference room reservation service (an example of the service regarding conference management).

The user of the information processing apparatus 100 may perform a touch operation on a reader-writer provided in a guide plate or the like in a conference room using the information processing apparatus 100, and thus a list of available conference rooms is displayed on a display screen of the information processing apparatus 100 (portion A of FIG. 8). The information (data) used to display the list of available conference rooms as shown in the portion A of FIG. 8 may be generated by the service providing apparatus according to the present embodiment connected to the reader-writer via a network (alternatively, directly) and may be provided for the information processing apparatus 100 through the reader-writer. The information used to display the list of available conference rooms as shown in the portion A of FIG. 8 may be provided by a device other than the service providing apparatus according to the present embodiment, such as a server having an ability to manage the reservation condition of conference rooms.

For example, the user who views the list of available conference rooms as shown in the portion A of FIG. 8 may go to a conference room and may perform a touch operation on an external object placed in the conference room using the information processing apparatus 100. In this case, the process for implementing the information processing method according to the present embodiment as described above is performed in the information processing apparatus 100. The service providing apparatus according to the present embodiment that acquires the apparatus-related information from the information processing apparatus 100 may determine that a conference room reservation service is provided for the information processing apparatus 100 by the process of the above item (I) (determination process). In this case, the service providing apparatus according to the present embodiment executes a process for the determined service by a process of item (II) (execution process) described later. Then, the service providing apparatus according to the present embodiment transmits information (an example of service information described later), which indicates contents relating to the reservation of the conference room corresponding to the spatial information contained in the apparatus-related information, for example as shown in the portion B of FIG. 8, to the information processing apparatus 100.

The service providing apparatus according to the present embodiment provides a service based on the apparatus-related information, which contains the spatial information, acquired from the information processing apparatus 100. The spatial information contained in the apparatus-related information is data acquired from an external object by the information processing apparatus according to the present embodiment. Thus, for example, the information processing apparatus 100 may acquire the spatial information from the external object placed in a "conference room for which a reservation has been made but not used actually" (hereinafter sometimes referred to as a "conference room left unused"). In this case, the service providing apparatus according to the present embodiment is also possible to change the reservation state of the conference room left unused by providing the conference room reservation service as shown in the portion B of FIG. 8 for the information processing apparatus 100.

Thus, the service providing apparatus according to the present embodiment can provide the conference room reservation service as shown in the portion B of FIG. 8 for the information processing apparatus 100, thereby facilitating the reservation and release of a conference room and achieving a more effective utilization rate of the conference room.

As described above, the information processing apparatus according to the present embodiment can extend the function of its own apparatus based on the information on function extension acquired from an external object placed in a conference room. Thus, the information processing apparatus according to the present embodiment can set the function of a device placed in a conference room as the function of its own apparatus. Accordingly, the information processing apparatus according to the present embodiment that performs the process for implementing the information processing method according to the present embodiment allows the user of the information processing apparatus according to the present embodiment to use more conveniently the device placed in the conference room.

The service providing apparatus according to the present embodiment provides a service in such a way as described by referring to FIG. 8. It should be understood that the service provided by the service providing apparatus according to the present embodiment is not limited to the example shown in FIG. 8.

(I-2) Second Example of Determination Process

As described above, the apparatus-related information according to the present embodiment acquired by the service providing apparatus according to the present embodiment may contain the identification information. The identification information allows the service providing apparatus according to the present embodiment to specify the information processing apparatus according to the present embodiment.

As an example, the service providing apparatus according to the present embodiment may manage a function of the information processing apparatus according to the present embodiment using information indicating the function of the information processing apparatus according to the present embodiment (it will be described later and sometimes referred to as "function-indicating information" hereinafter) in a function management process described later. In this case, the service providing apparatus according to the present embodiment updates the function-indicating information corresponding to the information processing apparatus according to the present embodiment specified by the identification information based on the acquired function information. The service providing apparatus according to the present embodiment determines a service to be provided for the information processing apparatus according to the present embodiment based on the acquired spatial information and the function indicated by the function-indicating information corresponding to the information processing apparatus indicated by the identification information. The function-indicating information is updated based on the acquired function information.

The service providing apparatus according to the present embodiment can specify the function of the information processing apparatus according to the present embodiment using the function indicated by the function-indicating information updated based on the acquired function information. The service providing apparatus according to the present embodiment can determine a situation in which the information processing apparatus is used, for example based on the acquired spatial information, in a similar way to the determination process according to the first example described above.

Thus, the service providing apparatus according to the present embodiment can provide a service for the information processing apparatus according to the present embodiment within the range of the function of the information processing apparatus according to the present embodiment by performing the determination process according to the second example. The service to be provided corresponds to the situation, in which the information processing apparatus is used, determined based on the acquired spatial information.

The determination process according to the second example is not limited to the example described above.

As an example, the service providing apparatus according to the present embodiment may manage the function-indicating information corresponding to a plurality of information processing apparatuses according to the present embodiment for each of the information processing apparatuses according to the present embodiment in a function management process described later. In this case, the service providing apparatus according to the present embodiment can update the function-indicating information corresponding to a plurality of information processing apparatuses according to the present embodiment for each of the information processing apparatuses. As described above, when the function-indicating information corresponding to a plurality of information processing apparatuses according to the present embodiment is updated for each of the information processing apparatuses, the service providing apparatus according to the present embodiment may further determine a service to be provided for the information processing apparatus according to the present embodiment, for example based on a function indicated by the function-indicating information corresponding to another information processing apparatus different from the information processing apparatus according to the present embodiment indicated by the acquired identification information.

The service providing apparatus according to the present embodiment may determine a service, which can also be provided within the range of the function of the other information processing apparatus among services that can be provided within the range of the function of the information processing apparatus according to the present embodiment indicated by the acquired identification information, as the service to be provided for the information processing apparatus according to the present embodiment.

Examples of the other information processing apparatus described above include an information processing apparatus belonging to the same group as the information processing apparatus according to the present embodiment indicated by the acquired identification information. The service providing apparatus according to the present embodiment may regard an information processing apparatus from which the apparatus-related information containing the same spatial information is acquired or an information processing apparatus specified by the user operation as the information processing apparatus belonging to the same group.

(I-3) Third Example of Determination Process

As described above, the apparatus-related information according to the present embodiment acquired by the service providing apparatus according to the present embodiment may contain the release information. When the release information is acquired, the service providing apparatus according to the present embodiment determines a service to be discontinued among services being provided for the information processing apparatus according to the present embodiment based on the acquired apparatus-related information.

The service providing apparatus according to the present embodiment determines a candidate of the service to be discontinued based on the acquired apparatus-related information, for example by performing a process similar to the determination of a service to be provided in the determination process according to the first example described above or the determination of a service to be provided in the determination process according to the second example described above. Then, the service providing apparatus according to the present embodiment determines a service being provided for the information processing apparatus according to the present embodiment among the determined service candidates, as a service to be discontinued.

(I-4) Fourth Example of Determination Process

As described above, the apparatus-related information according to the present embodiment acquired by the service providing apparatus according to the present embodiment may contain the identification information. As described in the determination process according to the second example described above, the service providing apparatus according to the present embodiment may manage the function of the information processing apparatus according to the present embodiment by performing a function management process described later. In this case, the service providing apparatus according to the present embodiment updates the function-indicating information corresponding to the information processing apparatus according to the present embodiment specified by the identification information based on the acquired function information.

The updating of the function-indicating information corresponding to the information processing apparatus according to the present embodiment based on the acquired function information may cause the service, which has been provided for the information processing apparatus according to the present embodiment, to be outside the range of the function indicated by the updated function-indicating information corresponding to the information processing apparatus according to the present embodiment.

Thus, when the service providing apparatus according to the present embodiment manages the function of the information processing apparatus according to the present embodiment, the service providing apparatus according to the present embodiment determines a service to be discontinued among services being provided for the information processing apparatus according to the present embodiment, for example based on the acquired spatial information and the function indicated by the function-indicating information, which corresponds to the information processing apparatus indicated by the identification information and is updated based on the acquired function information.

The service providing apparatus according to the present embodiment determines a service to be provided for the information processing apparatus according to the present embodiment, for example by performing a process similar to the determination of a service to be provided in the determination process according to the first example described above or the determination of a service to be provided in the determination process according to the second example described above. Then, the service providing apparatus according to the present embodiment determines a service that does not fall under the determined service among services that have been provided for the information processing apparatus according to the present embodiment, as the service to be discontinued.

The determination process according to the fourth example is not limited to the example described above.

As an example, the service providing apparatus according to the present embodiment may manage the function of a plurality of information processing apparatuses according to the present embodiment for each of the information processing apparatuses according to the present embodiment in a function management process described later. In this case, the service providing apparatus according to the present embodiment can update the function-indicating information corresponding to the plurality of information processing apparatuses according to the present embodiment for each of the information processing apparatuses. When the function-indicating information corresponding to the plurality of information processing apparatuses according to the present embodiment is updated for each of the information processing apparatuses as described above, the service providing apparatus according to the present embodiment may further determine a service to be discontinued among services being provided for the information processing apparatus according to the present embodiment, for example based on a function indicated by the function-indicating information, corresponding to another information processing apparatus different from the information processing apparatus according to the present embodiment indicated by the acquired identification information.

As an example, the service providing apparatus according to the present embodiment determines a service that does not fall under "service that is within the range of the function of the information processing apparatus according to the present embodiment indicated by the acquired identification information and is within a range of the function of other information processing apparatus" among services that have been provided for the information processing apparatus according to the present embodiment, as the service to be discontinued. As an example, the service providing apparatus according to the present embodiment does not have to determine a "service outside the range of the function of the information processing apparatus according to the present embodiment indicated by the acquired identification information but is within the range of the function of the other information processing apparatus" among services that have been provided for the information processing apparatus according to the present embodiment, as the service to be discontinued.

Examples of the other information processing apparatus described above include an information processing apparatus belonging to the same group as the information processing apparatus according to the present embodiment indicated by the acquired identification information in a similar way to the determination process according to the second example described above.

(I-5) Fifth Example of Determination Process

The service providing apparatus according to the present embodiment may be possible to perform any combination of two or more determination processes among the determination process according to the first or second example described above, the determination process according to the third example, and the determination process according to the fourth example.

(II) Execution Process

The service providing apparatus according to the present embodiment executes a process for the service determined to be provided in the process of the above item (I) (determination process). The service providing apparatus according to the present embodiment may execute the process for the service determined to be provided based on the determination result of the service determined to be provided in the determination process according to the first example described in the above item (I-1) or the determination process according to the second example described in the above item (I-2).

The service providing apparatus according to the present embodiment transmits service-related service information corresponding to the executed process for the service to the information processing apparatus according to the present embodiment. The service providing apparatus according to the present embodiment may control a communication device capable of communicating with the information processing apparatus according to the present embodiment so that the communication device transmits the service information, and thus the service information is transmitted to the information processing apparatus according to the present embodiment.

The service information according to the present embodiment may include examples as described below.

Data indicating the results of a conference room reservation or data that is shared in a conference (an example of service information relating to the service for business)

Content data (an example of service information relating to the service for entertainment)

Coupon data (an example of service information relating to the service that provides coupon data)

Game data or application data (an example of service information relating to the service that provides software)

Data indicating contents of communication with another apparatus (an example of service information relating to the service that supports communication)

An example of the service implemented by the service information transmitted from the service providing apparatus according to the present embodiment will be described in detail. The following description will be given of an example in which the service information transmitted from the service providing apparatus according to the present embodiment is the data indicating contents of communication with another apparatus.

The service providing apparatus according to the present embodiment specifies the function of an information processing apparatus according to one embodiment of the present disclosure (hereinafter, referred to as "information processing apparatus A" for convenience of description) based on the function information and identification information transmitted from the information processing apparatus A. The service providing apparatus according to the present embodiment may manage the function of the information processing apparatus A, such as which function is originally contained in the information processing apparatus A or which function is being extended.

The service providing apparatus according to the present embodiment specifies the function of an information processing apparatus according to another embodiment of the present disclosure (hereinafter, referred to as "information processing apparatus B" for convenience of description) based on the function information and identification information transmitted from the information processing apparatus B. The service providing apparatus according to the present embodiment may manage the function of the information processing apparatus B, such as which function is originally contained in the information processing apparatus B or which function is being extended.

The information processing apparatus A and the information processing apparatus B may communicate with each other through communication. In this case, the service providing apparatus according to the present embodiment that is accessed by the information processing apparatus A may analyze and determine a function suitable for the communication (e.g. a communication system according to the communication or a communication means such as a communication application) based on the function of the information processing apparatus B being managed. The service providing apparatus according to the present embodiment establishes communication using the function suitable for the determined communication between the information processing apparatus A and the information processing apparatus B, for example, "by relaying communication between the information processing apparatus A and the information processing apparatus B and by transmitting data indicating communication contents depending on the communication system corresponding to the function suitable for the determined communication to the information processing apparatus A and the information processing apparatus B".

The service information according to the present embodiment is not limited to examples described below. Examples of the service information according to the present embodiment include any type of data regarding the service executed by the service providing apparatus according to the present embodiment.

The communication device capable of communicating with the information processing apparatus according to the present embodiment may be provided in the service providing apparatus according to the present embodiment or may be an external device connected to the service providing apparatus according to the present embodiment.

The service providing apparatus according to the present embodiment may transmit the service information as described above to the information processing apparatus according to the present embodiment based on the apparatus-related information acquired from the information processing apparatus according to the present embodiment. Thus, the service providing apparatus according to the present embodiment can provide a service, which corresponds to the space where the function extension is performed by the external device determined based on the spatial information within a range of the function of the information processing apparatus according to the present embodiment, for the information processing apparatus according to the present embodiment (information processing apparatus whose function is extended using the function of the external device). Accordingly, the service providing apparatus according to the present embodiment can provide a higher added-value service for the user of the information processing apparatus according to the present embodiment.

The execution process according to the present embodiment is not limited to the example described above. For example, the service providing apparatus according to the present embodiment performs, as the process of the above item (II) (execution process), execution processes according to first to third examples described below in response to the process of the above item (I) (determination process).

(II-1) First Example of Execution Process

As an example, when the determination process according to the third example described in the above item (I-3) is performed in the process of the above item (I) (determination process), the service providing apparatus according to the present embodiment terminates the execution of the process for the service determined to be discontinued in the determination process according to the third example described above. The termination of the execution of the process for the service determined to be discontinued in the determination process according to the third example described above allows the provision of the service determined to be discontinued in the determination process according to the third example described above for the information processing apparatus according to the present embodiment to be terminated.

(II-2) Second Example of Execution Process

As an example, when the determination process according to the fourth example described in the above item (I-4) is performed in the process of the above item (I) (determination process), the service providing apparatus according to the present embodiment terminates the execution of the process for the service determined to be discontinued in the determination process according to the fourth example described above. The termination of the execution of the process for the service determined to be discontinued in the determination process according to the fourth example described above allows the provision of the service determined to be discontinued in the determination process according to the fourth example described above for the information processing apparatus according to the present embodiment to be terminated.

(II-3) Third Example of Execution Process

A method of terminating the execution of the process for a service by the service providing apparatus according to the present embodiment is not limited to the method based on the determination result obtained by the process of the above item (I) (determination process). For example, the service providing apparatus according to the present embodiment is also possible to terminate selectively the execution of the process for a service being provided for the information processing apparatus according to the present embodiment, based on a detection result by a detection device configured to detect the condition of the space corresponding to the spatial information.

Examples of the detection device configured to detect the condition of the space corresponding to the spatial information according to the present embodiment may include a sensor that can be used to detect a living body or moving body in the space corresponding to the spatial information, such as an infrared sensor and a magnetic field sensor, which is provided in the space.

In performing the execution process according to the third example, for example, when the detection result obtained by the detection device configured to detect the condition of the space corresponding to the spatial information shows that a living body or moving body is detected, the service providing apparatus according to the present embodiment is prevented from terminating the execution of the process for the service being provided.

In performing the execution process according to the third example, for example, when the detection result obtained by the detection device configured to detect the condition of the space corresponding to the spatial information does not show that a living body or moving body is detected, the service providing apparatus according to the present embodiment terminates the execution of the process for the service being provided. For example, when the detection result obtained by the detection device does not show that a living body or moving body is detected for more than a predetermined time (or longer than the predetermined time), the service providing apparatus according to the present embodiment may terminate the execution of the process for the service being provided.

For example, as described above, the service providing apparatus according to the present embodiment can terminate selectively the execution of the process for the service being provided for the information processing apparatus according to the present embodiment, based on the detection result by the detection device configured to detect the condition of the space corresponding to the spatial information. Thus, it is possible to achieve, for example, details as described in examples below. Although the case in which the service provided by the service providing apparatus according to the present embodiment is a conference room reservation service is taken below as an example, it should be understood that the example in which the execution of the process for the service being provided for the information processing apparatus according to the present embodiment is terminated in the execution process according to the third example is not limited to examples described below.

Automatic release of reservation for a conference room left unused

Automatic release of reservation for a conference room for which its use is completed earlier than a scheduled time The service providing apparatus according to the present embodiment may perform the process of the above item (I) (determination process) and the process of the above item (II) (execution process), as the process for implementing the service providing method according to the present embodiment.

In this regard, the service providing apparatus according to the present embodiment provides the service, which is determined to be provided in the process of the above item (I) (determination process), for one or more information processing apparatuses according to the present embodiment in the process of the above item (II) (execution process). The process of the above item (I) (determination process) may be performed based on the apparatus-related information acquired from the information processing apparatus according to the present embodiment. In this case, the apparatus-related information may contains the spatial information acquired from an external object by the information processing apparatus according to the present embodiment and the function information.

Thus, the process of the above item (I) (determination process) and the process of the above item (II) (execution process) performed by the service providing apparatus according to the present embodiment allows the service providing apparatus according to the present embodiment to provide a service corresponding to the space where the function extension is performed by the external object determined based on the spatial information for the information processing apparatus according to the present embodiment.

The service providing apparatus according to the present embodiment can provide the service corresponding to the space where the function extension is performed using the external object determined based on the spatial information within a range of the function of the information processing apparatus according to the present embodiment.

The service providing apparatus transmits various types of information depending on the determined service in the process of the above item (II) (execution process), such as data indicating content associated with the space indicated by the spatial information, to the information processing apparatus according to the present embodiment. The spatial information used in the process of the above item (I) (determination process) is the information acquired from the external object placed in the space by the information processing apparatus according to the present embodiment. Thus, the spatial information acquired from the information processing apparatus according to the present embodiment by the service providing apparatus according to the present embodiment may be information in which "behavior of the user of the information processing apparatus according to the present embodiment in the space corresponding to the spatial information" and "space corresponding to the spatial information" are linked to each other.

Consequently, the service providing apparatus according to the present embodiment can perform the process of the above item (I) (determination process) and the process of the above item (II) (execution process), as the process for implementing the service providing method according to the present embodiment. Thus, "the behavior of the user and the spatial information are linked to each other and then the resultant is linked to information or service in the vicinity of the space corresponding to the spatial information", and thereby creating the added value.

The process for implementing the service providing method according to the present embodiment is not limited to the process of the above item (I) (determination process) and the process of the above item (II) (execution process).

(III) Function Management Process

For example, the service providing apparatus according to the present embodiment is also possible to manage the function of the information processing apparatus according to the present embodiment. The service providing apparatus according to the present embodiment manages the function of the information processing apparatus according to the present embodiment, for example by an update of the "information indicating the function of the information processing apparatus according to the present embodiment".

When a plurality of information processing apparatuses are managed, the service providing apparatus according to the present embodiment manages the function of the information processing apparatus according to the present embodiment for each of the information processing apparatuses. The service providing apparatus according to the present embodiment manages the function of the information processing apparatus according to the present embodiment for each of the information processing apparatuses by updating "the information indicating the function of the information processing apparatus according to the present embodiment" for each of the information processing apparatuses.

The service providing apparatus according to the present embodiment manages the function of the information processing apparatus according to the present embodiment for each of the information processing apparatuses, for example by updating individually multiple pieces of function-indicating information according to the present embodiment corresponding to a plurality of information processing apparatuses according to the present embodiment.

The service providing apparatus according to the present embodiment may manage the function of the information processing apparatus according to the present embodiment for each of the information processing apparatuses by updating one piece of function-indicating information according to the present embodiment corresponding to a plurality of information processing apparatuses according to the present embodiment. The service providing apparatus according to the present embodiment may manage the function of the information processing apparatus according to the present embodiment for each of the information processing apparatuses, for example by updating the function of each of a plurality of information processing apparatuses according to the present embodiment indicated by one piece of function-indicating information according to the present embodiment for each of the information processing apparatuses.

More specifically, the service providing apparatus according to the present embodiment updates the information indicating the function of the information processing apparatus corresponding to the information processing apparatus indicated by the identification information based on the acquired function information and identification information.

In this regard, examples of the function-indicating information according to the present embodiment include a table or database in which the information processing apparatus according to the present embodiment and the function of the information processing apparatus according to the present embodiment are recorded in association with each other. In the function-indicating information according to the present embodiment, the information processing apparatus according to the present embodiment and the user of the information processing apparatus according to the present embodiment may be recorded in association with each other. The function-indicating information according to the present embodiment is not limited to a table or a database. The function-indicating information according to the present embodiment may be any form of data on which "the information processing apparatus according to the present embodiment and the function of the information processing apparatus according to the present embodiment" can be recorded in association with each other.

FIG. 9 is a diagram illustrated to describe an example of the process for implementing the service providing method according to the present embodiment, and illustrates an example of the function-indicating information used in the function management process according to the present embodiment by the service providing apparatus according to the present embodiment. FIG. 9 illustrates an example in which the function-indicating information according to the present embodiment is a table (or database). More specifically, the portion A of FIG. 9 illustrates an example of a table (or database) in which a device ID used to identify the information processing apparatus according to the present embodiment (an example of the identification information according to the present embodiment) and a user ID used to identify the user of the information processing apparatus according to the present embodiment are associated with each other. The portion B of FIG. 9 illustrates an example of a table (or database) in which the device ID (an example of the identification information according to the present embodiment) and the function information of the information processing apparatus according to the present embodiment are associated with each other. The table (or database) shown in the portion A of FIG. 9 and the table (or database) shown in the portion B of FIG. 9 may be a single table (or database).

FIG. 9 illustrates an example in which the table (or database) in the portion A of FIG. 9 and the table (or database) in the portion B of FIG. 9 show the association using the device ID, that is, the example in which the service providing apparatus according to the present embodiment manages the association between an information processing apparatus owned by the user and the function of the information processing apparatus. The information processing apparatus according to the present embodiment does not have to manage the association between an information processing apparatus owned by the user and the function of the information processing apparatus, for example as shown in FIG. 9.

The service providing apparatus according to the present embodiment may update the function-indicating information according to the present embodiment, for example by updating the table (or database) as shown in the portion B of FIG. 9, based on the identification information and the function information contained in the apparatus-related information transmitted from the information processing apparatus according to the present embodiment. More specifically, the service providing apparatus according to the present embodiment may specify a device ID corresponding to the acquired identification information, for example, from the table (or database) shown in the portion B of FIG. 9. The service providing apparatus according to the present embodiment updates the table (or database) so that the specified device ID and the function indicated by the acquired function information are associated with each other.

The update of the function-indicating information according to the present embodiment allows the function of the information processing apparatus according to the present embodiment managed by the service providing apparatus according to the present embodiment to be updated. In the following description, the update of the function-indicating information according to the present embodiment performed by the function management process according to the present embodiment is sometimes referred to as "update of the function of the information processing apparatus according to the present embodiment".

When a plurality of information processing apparatuses according to the present embodiment are present, the service providing apparatus according to the present embodiment may updates a table (or database) as shown in the portion B of FIG. 9 for each of the information processing apparatuses according to the present embodiment. Thus, even when a plurality of information processing apparatuses according to the present embodiment are present, the service providing apparatus according to the present embodiment can manage the function of each of the information processing apparatuses according to the present embodiment for each of the information processing apparatuses according to the present embodiment.

(IV) Recording Control Process

For example, when the execution of the process for the service being provided for the information processing apparatus according to the present embodiment by the execution processes according to the first to third examples described in the above items (II-1) to (II-3) is terminated, the service providing apparatus according to the present embodiment may record the information on the process for the service being executed on a recording medium.

In this regard, examples of the information on the process for the service being executed according to the embodiment include data shown in examples below. Although the following description will be given by taking, as an example, a case in which the service provided by the service providing apparatus according to the present embodiment is a business service (e.g. a service regarding conference management), It should be understood that examples of the information on the process for the service being executed are not limited to the data shown in examples below.

Data of materials used in a conference

Data indicating contents written on a whiteboard provided in a conference room

Examples of the recording medium on which the information on the process for the service being executed is recorded by the service providing apparatus according to the present embodiment include a storage unit (described later) included in the service providing apparatus according to the present embodiment, an external recording medium connected to the service providing apparatus according to the present embodiment, and a recording medium provided in the external apparatus capable of communicating with the service providing apparatus according to the present embodiment.

The service providing apparatus according to the present embodiment may set an access restriction on the information on the process for the service being executed, which is recorded on the recording medium. The service providing apparatus according to the present embodiment authorizes the user who is suitable for the information processing apparatus according to the present embodiment belonging to a group related to the provision of service to access the information on the process for the service being executed, which is stored in the recording medium, by using the tables shown in the portions A and B of FIG. 9.

For example, as described above, the service providing apparatus according to the present embodiment implements "the sharing of materials regarding the conference between the users who participate in the conference after the conference" by setting an access restriction on the information on the process for the service being executed, which is recorded on the recording medium.

[II] Process for Implementing Service Providing Method According to Embodiment

A description will be given of a specific example of the process for implementing the service providing method according to the present embodiment described above.

Figure 10:
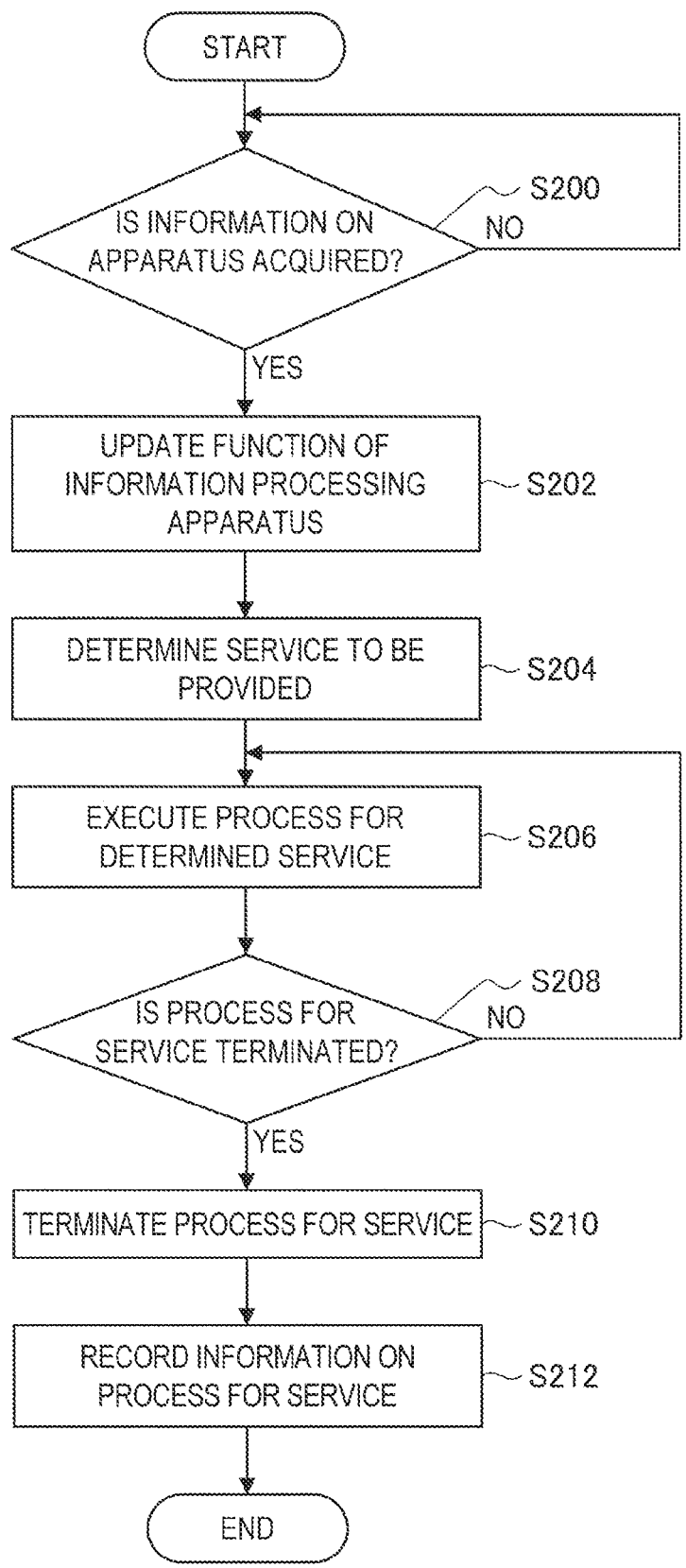
FIG. 10 is a flowchart illustrating another example of the process for implementing the service providing method according to the present embodiment.

FIG. 10 is a flowchart illustrating another example of the process for implementing the service providing method according to the present embodiment. The process in step S204 of FIG. 10 corresponds to the process of the above item (I) (determination process). The process in steps S206 to S210 of FIG. 10 corresponds to the process of the above item (II) (execution process). The process in step S202 of FIG. 10 corresponds to the process of the above item (III) (function management process), and the process in step S212 of FIG. 10 corresponds to the process of the above item (IV) (recording control process).

The service providing apparatus according to the present embodiment determines whether the apparatus-related information is acquired (S200).

If it is not determined in step S200 that the apparatus-related information is acquired, the service providing apparatus according to the present embodiment does not continue the process until the apparatus-related information is determined to be acquired.

If it is determined in step S200 that the apparatus-related information is acquired, the service providing apparatus according to the present embodiment may update the function of the information processing apparatus according to the present embodiment based on the acquired apparatus-related information (S202). The service providing apparatus according to the present embodiment updates the function of the information processing apparatus according to the present embodiment, for example by updating the table (or database) as shown in the portion B of FIG. 9, based on the identification information and the function information contained in the apparatus-related information transmitted from the information processing apparatus according to the present embodiment.

If the function of the information processing apparatus according to the present embodiment is updated in step S202, the service providing apparatus according to the present embodiment determines a service to be provided for the information processing apparatus according to the present embodiment (S204). The service providing apparatus according to the present embodiment determines a service to be provided for the information processing apparatus according to the present embodiment, for example by performing the determination process according to the second example described in the above item (I-2).

If the process in step S204 is performed, the service providing apparatus according to the present embodiment executes the process for the service determined in step S204 (S206). The service providing apparatus according to the present embodiment transmits the service-related service information, which corresponds to the executed process for the service, to the information processing apparatus according to the present embodiment in an appropriate way.

The service providing apparatus according to the present embodiment determines whether the process for the service being executed is terminated (S208). The service providing apparatus according to the present embodiment determines to terminate the process for the service being executed, when the service is determined to be discontinued in the determination process according to the third example described in the above item (I-3) or in the determination process according to the fourth example described in the above item (I-4), or when the detection result obtained by the detection device configured to detect the condition of the space corresponding to the spatial information does not show that a living body or moving body is detected.

If it is not determined in step S208 that the process for the service being executed is terminated, the service providing apparatus according to the present embodiment repeats the process from step S206.

If it is determined in step S208 that the process for the service being executed is terminated, the service providing apparatus according to the present embodiment terminates the process for the service being executed (S210). The service providing apparatus according to the present embodiment may perform the execution processes according to the first to third examples described in the above items (II-1) to (II-3).

If the process in step S210 is performed, the service providing apparatus according to the present embodiment records the information on the process for the service being executed in step S206 on a recording medium (S212).

The service providing apparatus according to the present embodiment may perform the process shown in FIG. 10, as the process for implementing the service providing method according to the present embodiment. For example, when the process shown in FIG. 1 is performed, the process of the above item (I) (determination process) and the process of the above item (II) (execution process) are implemented.

Thus, the process shown in FIG. 10 performed by the service providing apparatus according to the present embodiment allows the service providing apparatus according to the present embodiment to provide a service, which corresponds to the space where the function extension is performed using the external device determined based on the spatial information, for the information processing apparatus according to the present embodiment. The service providing apparatus according to the present embodiment can provide the service corresponding to the space where the function extension is performed using the external device determined based on the spatial information within the range of the function of the information processing apparatus according to the present embodiment.

The process for implementing the service providing method according to the present embodiment is not limited to the process shown in FIG. 10.

For example, the service providing apparatus according to the present embodiment does not have to perform the process in step S202 shown in FIG. 10. Even when the process in step S202 is not performed, the service providing apparatus according to the present embodiment can determine a service to be provided for the information processing apparatus according to the present embodiment, for example by performing the determination process according to the first example described in the above item (I-1).

Thus, even when the process in step S202 is not performed, the service providing apparatus according to the present embodiment can achieve the same advantages as those of the process shown in FIG. 10

The service providing apparatus according to the present embodiment does not have to perform the process in step S212 shown in FIG. 10. The process in step S212 shown in FIG. 10 does not have to be performed. Even when the process in step S202 is not performed, the service providing apparatus according to the present embodiment can implement the process of the above item (I) (determination process) and the process of the above item (II) (execution process).

Thus, even when the process in step S212 is not performed, the service providing apparatus according to the present embodiment can provide the service, which corresponds to the space where the function extension is performed using the external device determined based on the spatial information, for the information processing apparatus according to the present embodiment. The service providing apparatus according to the present embodiment can provide the service corresponding to the space where the function extension is performed by the external device determined based on the spatial information within the range of the function of the information processing apparatus according to the present embodiment.

(Exemplary Process in Information Processing System According to Embodiment)

An example of the process in the information processing system according to the present embodiment, for example, as shown in FIG. 2 will be illustrated. The information processing system according to the present embodiment is configured to include the information processing apparatus according to the present embodiment that performs the process for implementing the information processing method according to the present embodiment and the service providing apparatus according to the present embodiment that performs the service providing method according to the present embodiment.

The following description will be given of an example of the process in the information processing system according to the present embodiment by taking as an example the case in which the information processing system according to the present embodiment is configured to include the information processing apparatus 100, the RF tag 200 (an example of an external object), the device 300, and the service providing apparatus 400 as shown in FIG. 2. In other words, the description will be given below by taking as an example the case in which the information processing apparatus 100 and the RF tag 200 communicate with each other using the wireless communication technology including NFC-based communication technology or RFID technology and the information processing apparatus 100 acquires the information on the function extension from the RF tag 200 through the wireless communication. It should be understood that the configuration of the information processing system according to the present embodiment is not limited to that shown in FIG. 2.

(i) First Example of Process in Information Processing System According to Embodiment An example of the process in the case where the service providing apparatus according to the present embodiment provides a service regarding conference management is illustrated as a first example of the process in the information processing system according to the present embodiment.

Figure 11:
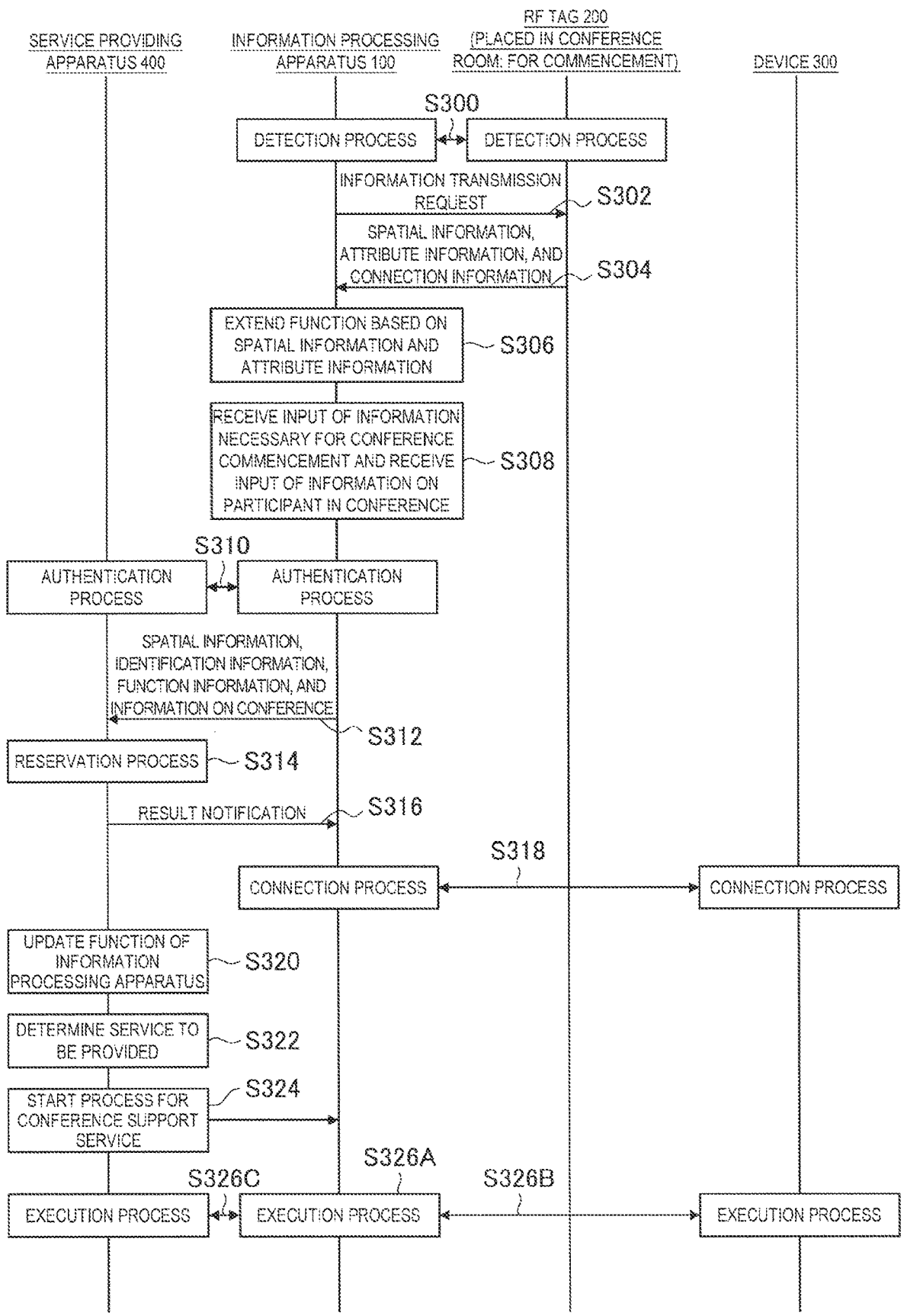
FIG. 11 is a diagram illustrated to describe a first example of the process in an information processing system according to the present embodiment.

FIG. 11 is a diagram illustrated to describe a first example of the process in the information processing system according to the present embodiment. FIG. 11 illustrates an example of the process in the information processing system according to the present embodiment when the information processing apparatus 100 acquires the spatial information, the attribute information, and the connection information from the RF tag 200.

In FIG. 11, for example, the process in steps S300 to S304 in the information processing apparatus 100 corresponds to the process of the above item (1) (acquisition control process). In FIG. 11, for example, the process in steps S306, S310, and S318 in the information processing apparatus 100 corresponds to the process of the above item (2) (function control process).

In FIG. 11, for example, the process in step S322 in the service providing apparatus 400 corresponds to the process of the above item (I) (determination process). In FIG. 11, for example, the process in steps S324 and S326C in the service providing apparatus 400 corresponds to the process of the above item (II) (execution process). In FIG. 11, for example, the process in step S320 in the service providing apparatus 400 corresponds to the process of the above item (III) (function management process).

When the distance between the information processing apparatus 100 and the RF tag 200 is within the communicable range, for example, through the touch operation by the user, the information processing apparatus 100 and the RF tag 200 perform a detection process to detect a communication target to be communicated (S300). In the process in step S300, the information processing apparatus 100 may serve as a reader-writer that transmits a carrier wave independently, and the RF tag 200 may serve to provide a response by performing load modulation based on the received carrier wave. More specifically, the process in step S300 may be performed by transmitting a polling signal using a carrier wave periodically or non-periodically and by receiving a response signal transmitted by load modulation from the RF tag 200 receiving the carrier wave.

When the RF tag 200 is detected in step S300, the information processing apparatus 100 transmits an information transmission request that contains an instruction to request the transmission of the information on the function extension (S302).

The RF tag 200, when receiving the information transmission request transmitted from the information processing apparatus 100 in step S302, transmits the information on the function extension in response to the information transmission request (S304). FIG. 11 illustrates an example in which the RF tag 200 transmits the spatial information, the attribute information, and the connection information as information on the function extension.

The information processing apparatus 100, when receiving the spatial information, the attribute information, and the connection information transmitted from the RF tag 200 in step S304, extends the function based on the spatial information and the attribute information (S306). The information processing apparatus according to the present embodiment performs a process relating to the function extension, for example, as described in the above item (2-3-1) or (2-3-2), in step S306.

The information processing apparatus 100 receives an input of information necessary for conference commencement and an input of information on participants in a conference (S308).

In this regard, examples of the information necessary for conference commencement according to the present embodiment include data indicating a time zone in which the conference is held and data indicating a profile of the conference. The information necessary for conference commencement according to the present embodiment may be obtained based on the user operation using an operation unit (described later) provided in the information processing apparatus 100. Examples of the information on participants in a conference according to the present embodiment include data that can be used to identify a participant, such as an ID indicating a participant in a conference. The information on participants in a conference according to the present embodiment may be obtained by allowing the information processing apparatus 100 to read data that can be used to identify a participant from an ID card (e.g. an employee ID card) in which data that can be used to identify a participant is stored. In the following description, the information necessary for conference commencement according to the present and the information on a participant in a conference, which are obtained in step S308, are collectively referred to as "information on conference".

When the process in step S308 is performed, the information processing apparatus 100 does not perform the process in step S310 and the subsequent steps until the user operation for starting a service regarding conference management is performed. It is also possible for the information processing apparatus 100 to not perform the process in step S308. When the process in step S308 is not performed, the information processing apparatus 100 may perform the process in step S310 and the subsequent steps after the process in step S306 is performed.

The information processing apparatus 100 performs an authentication process between itself and the service providing apparatus 400 to be connected to the service providing apparatus 400 (S308). The authentication process between the information processing apparatus 100 and the service providing apparatus 400 may be performed by allowing the information processing apparatus 100 to transmit an ID and a password to the service providing apparatus 400 and by allowing the comparison between the ID and the password to be performed in the service providing apparatus 400. When the information processing apparatus 100 is authenticated in the service providing apparatus by the authentication process, the information processing apparatus 100 is ready to communicate with the service providing apparatus 400.

Although FIG. 11 illustrates an example in which the process in step S310 is performed after the process in step S306 is performed, the process in the information processing system according to the present embodiment is not limited thereto. For example, in the information processing system according to the present embodiment, the information processing apparatus 100 may login to the service providing apparatus based on the user operation before the process in step S300 is performed. When the information processing apparatus 100 is logged in to the service providing apparatus, the information processing system may omit the process in step S310.

When the authentication process in step S310 is successfully completed and it is ready to communicate, the information processing apparatus 100 may transmit the apparatus-related information and the information on conference to the service providing apparatus 400 (S312). FIG. 11 illustrates an example in which the information processing apparatus 100 transmits the spatial information, the identification information, and the function information, as the apparatus-related information.

The service providing apparatus 400, when receiving the information on conference transmitted from the information processing apparatus 100 in step S312, performs a reservation process for making a reservation for a conference room based on the information on conference (S314). The service providing apparatus 400 transmits a result obtained by the reservation process to the information processing apparatus 100 (S316). In the following description, a case where a conference room is reserved in step S314 will be given as an example.

The information processing apparatus 100 may perform a connection process to start the communication with the device 300 corresponding to the function extended by the process in step S306, and may connect to the device 300 (S312). The information processing apparatus 100 may start the communication with the device 300 using the connection information of the device corresponding to the function extended by the process in step S306, which is received in step S304, and thus the connection to the device 300 is established. Although FIG. 11 illustrates only one device 300, the information processing apparatus 100 may be connected to a plurality of devices, as described above.

Although FIG. 11 illustrates an example in which the information processing apparatus 100 performs the process in step S310 and then performs the process in step S318, the process in the information processing apparatus 100 is not limited thereto. For example, the information processing apparatus 100 may perform the process in steps S310 and S312 after the process in step S318 is performed, or may perform the process in steps S310 and S312 and the process in step S318 in synchronization with each other. The information processing apparatus 100 is also possible to perform the process in step S318 based on the result obtained by the process in step S316 transmitted from the service providing apparatus 400.

The service providing apparatus 400, when receiving the apparatus-related information (spatial information, identification information, and function information) transmitted from the information processing apparatus 100 in step S312, updates the function of the information processing apparatus 100 (S320). The service providing apparatus 400 may update the function of the information processing apparatus 100, for example by updating the table (or database) as shown in the portion B of FIG. 9 based on the identification information and the function information transmitted from the information processing apparatus 100.

When the function of the information processing apparatus 100 is updated in step S316, the service providing apparatus 400 determines a service to be provided for the information processing apparatus 100 (S322).

The service providing apparatus 400 determines a service to be provided for the information processing apparatus 100, for example by performing the determination process according to the second example described in the above item (I-2).

The process in step S322 performed by the service providing apparatus 400 is not limited to the determination process according to the second example described in the above item (I-2). For example, the service providing apparatus 400 is also possible to determine a service to be provided based on the information on conference transmitted from the information processing apparatus 100 in step S312.

Figure 12:
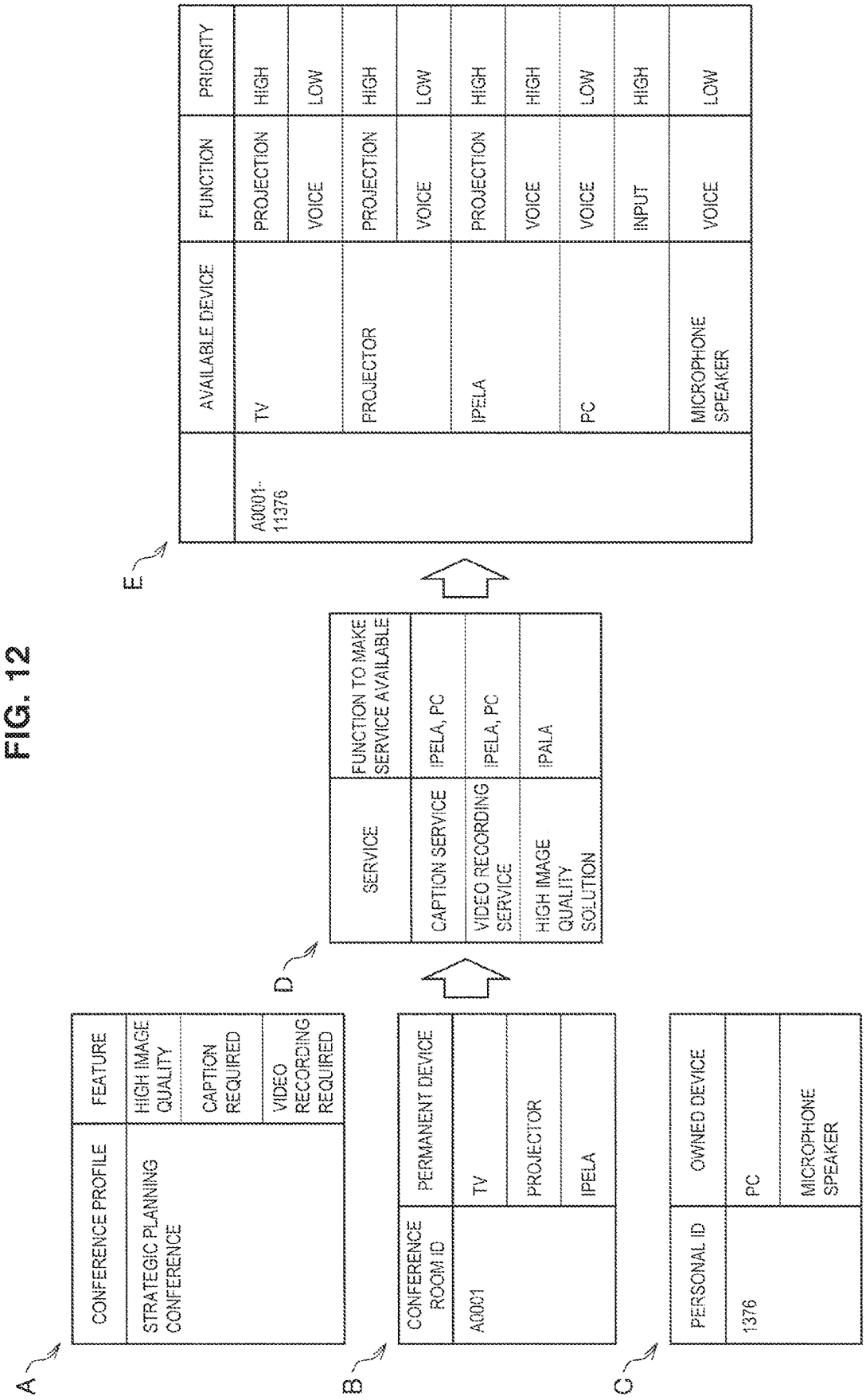
FIG. 12 is a diagram illustrated to describe an example of the process for implementing the service providing method according to the present embodiment.

FIG. 12 is a diagram illustrated to describe an example of the process for implementing the service providing method according to the present embodiment.

The portion A of FIG. 12 illustrates data (an example of the information on conference) indicating a profile of a conference. The portion B of FIG. 12 illustrates information of a device placed in the space indicated by the spatial information. The portion C of FIG. 12 illustrates information of a device owned by the user. The information of a device placed in the space indicated by the spatial information shown in the portion B of FIG. 12 or the information of a device owned by the user shown in the portion C of FIG. 12 may be read from a recording medium such as a storage unit (described later) by the service providing apparatus 400. The information of a device placed in the space indicated by the spatial information shown in the portion B of FIG. 12 or the information of a device owned by the user shown in the portion C of FIG. 12 may be contained in the information on the conference.

The portion D of FIG. 12 illustrates a list of services determined to be provided by the service providing apparatus 400 based on the portions A to C of FIG. 12 or the acquired function information. The portion E of FIG. 12 illustrates an example in which the priority of a device intended for receiving and using the service provided in the conference (an example of a space indicated by the spatial information) is set based on the portions A to D of FIG. 12 or the like.

For example, the use of the information on conference transmitted from the information processing apparatus 100 in step S312 allows the service providing apparatus 400 to provide a corresponding service depending on the condition of the space corresponding to the spatial information using information that is unrelated to a location corresponding to the spatial information.

The service providing apparatus 400 can identify a participant based on an ID indicating a participant in a conference, and provide a service suitable for the identified participant. The ID indicating a participant in the conference is contained in the information on conference transmitted from the information processing apparatus 100 in step S312. As a specific example, if a participant has an inability to hear, the service providing apparatus 400 determines a high quality closed caption service, as the service to be provided.

The service providing apparatus 400 may set the priority of a device intended for receiving and using the service provided in a conference (an example of a space indicated by the spatial information) depending on the determined service, for example as shown in the portion E of FIG. 12.

When the priority of a device intended for receiving and using the service provided in a conference is set, the service providing apparatus 400 may transmit data indicating the set priority level to the information processing apparatus 100, as service information. The information processing apparatus 100, when receiving the data indicating the set priority level (an example of service information) transmitted from the service providing apparatus 400, may perform the function extension (or change in the extended function) based on the data indicating the received priority level.

For example, as described above, the service providing apparatus 400 can set the priority of the device intended for receiving and using the service provided in the conference (an example of the space indicated by the spatial information) depending on the determined service and can transmit data indicating the set priority level to the information processing apparatus 100. This allows the information processing apparatus 100 to perform a process using a function suitable for the service being provided.

In the following, a description will be given of a case where a conference support service (an example of the service on conference management), such as sharing of information between conference participants, is determined as a service to be provided for the information processing apparatus 100 in step S322.

Examples of the conference support service according to the present embodiment include various services for a conference as described below. It should be understood that the conference support service according to the present embodiment is not limited to examples described below.

File sharing between information processing apparatuses
Selection of a communication system in communication between information processing apparatuses
Provision of tools used in a conference
Conference reservation Referring also to FIG. 11, a first example of the process in the information processing system according to the present embodiment will be described. When the service to be provided for the information processing apparatus 100 is determined in step S322, the service providing apparatus 400 starts the process for the conference support service, which is the process for the determined service (S324). The service providing apparatus 400 may transmit service information corresponding to the result obtained by the process on the service to an appropriate information processing apparatus 100.

The information processing apparatus 100 performs "a process to be completed solely by the information processing apparatus 100 using the inherent function of the information processing apparatus 100", "a process in cooperation with the device 300 (an example of the process using the extended function)", or "a process in cooperation with the service providing apparatus 400" (S326A, S326B, and S326C). Examples of the process in the information processing apparatus 100 include "a process using the function that contained in its own apparatus prior to the function extension", "a process based on the service information transmitted from the service providing apparatus 400" (a process using the function that contained in its own apparatus prior to the function extension or a process using the extended function), "a process in cooperation with the device 300 corresponding to the extended function", "a process in cooperation with the service providing apparatus 400" (a process using the function that contained in its own apparatus prior to the function extension or a process using the extended function), or a combination of these processes.

The information processing system according to the present embodiment may perform the process as shown in FIG. 11. For example, the process as shown in FIG. 11 allows the information processing apparatus 100 to extend the function using the function of the external device 300, or to perform the process to be completed solely by the information processing apparatus 100 or the process in cooperation with the device 300 or the service providing apparatus 400. For example, the process shown in FIG. 11 allows the service providing apparatus 400 to provide a service, which corresponds to a conference room (an example of the space where the function extension is performed using an external device) such as a conference support service, for the information processing apparatus 100 whose function is extended using the function of an external device.

In the information processing system according to the present embodiment, it should be understood that the process for the function extension of the information processing apparatus 100 and the process for the provision of the conference support service by the service providing apparatus 400 are not limited to the example shown in FIG. 11.

(ii) Second Example of Process in Information Processing System According to Embodiment Another example of the process in the case where the service providing apparatus according to the present embodiment provides a service regarding conference management is illustrated as a second example of the process in the information processing system according to the present embodiment.

Figure 13:
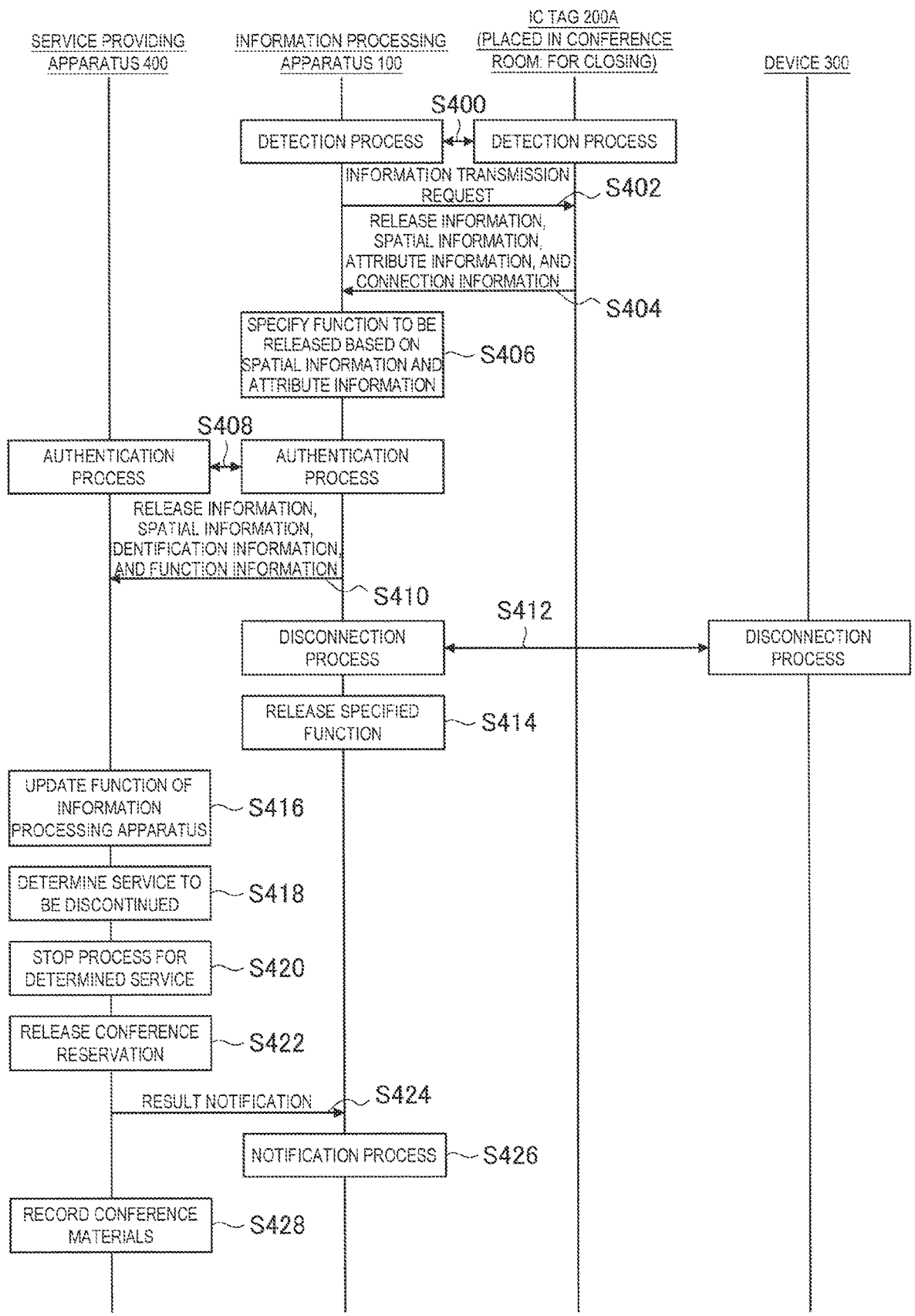
FIG. 13 is a diagram illustrated to describe a second example of the process in an information processing system according to the present embodiment.

FIG. 13 is a diagram illustrated to describe a second example of the process in the information processing system according to the present embodiment. FIG. 13 illustrates an example of the process in the information processing system according to the present embodiment when the information processing apparatus 100 acquires the release information, the spatial information, the attribute information, and the connection information from the RF tag 200. FIG. 13 illustrates an example of the process in a case where the conference support service (an example of the service on the conference management) provided from the service providing apparatus 400 by the process shown in FIG. 11 is terminated.

In FIG. 13, for example, the process in steps S400 to S404 in the information processing apparatus 100 may correspond to the process of the above item (1) (the acquisition control process). In FIG. 13, for example, the process in steps S406 to S414 in the information processing apparatus 100 may correspond to the process of the above item (2) (the function control process).

In FIG. 13, for example, the process in step S418 in the service providing apparatus 400 corresponds to the process of the above item (I) (determination process). In FIG. 13, for example, the process in steps S420, S422, and S424 in the service providing apparatus 400 corresponds to the process of the above item (II) (execution process). In FIG. 13, for example, the process in step S416 in the service providing apparatus 400 corresponds to the process of the above item (III) (function management process), and the process in step S428 S416 in the service providing apparatus 400 corresponds to the process of the above item (IV) (recording control process).

For example, when the distance between the information processing apparatus 100 and the RF tag 200 becomes within the communicable range through the touch operation by the user, the information processing apparatus 100 and the RF tag 200 perform a detection process, for example, in a similar way to step S300 shown in FIG. 11 (S400).

When the RF tag 200 is detected in step S400, the information processing apparatus 100 transmits an information transmission request (S402).

The RF tag 200, when receiving the information transmission request transmitted from the information processing apparatus 100 in step S402, transmits the information on the function extension in response to the information transmission request (S404). FIG. 13 illustrates an example in which the RF tag 200 transmits the release information, the spatial information, the attribute information, and the connection information as information on the function extension.

The information processing apparatus 100, when receiving the release information, the spatial information, the attribute information, and the connection information that are transmitted from the RF tag 200 in step S404, determines to release the extended function based on the release information and specifies a function to be released based on the spatial information and the attribute information (S406). The information processing apparatus according to the present embodiment may specify a function to be released by performing a process similar to the process of specifying the function to be extended in the process for the function extension, for example, as described in the above item (2-3-1) or (2-3-2), in step S406.

The information processing apparatus 100 performs an authentication process between itself and the service providing apparatus 400, for example, in a similar way to step S310 shown in FIG. 11, and is connected to the service providing apparatus 400 (S410). When the information processing apparatus 100 and the service providing apparatus 400 are previously connected to each other, i.e., when the information processing apparatus 100 and the service providing apparatus 400 are ready to communicate with each other, the information processing apparatus 100 does not have to perform the process in step S408 between itself and the service providing apparatus 400.

When the authentication process in step S408 is successfully completed and it is ready to communicate, the information processing apparatus 100 may transmit the apparatus-related information to the service providing apparatus 400 (S410). FIG. 13 illustrates an example in which the information processing apparatus 100 transmits the release information, the spatial information, the identification information, and the function information, as the apparatus-related information.

The information processing apparatus 100 terminates the connection to the device 300 corresponding to the function specified in the process in step S406 (S412). The information processing apparatus 100 may terminate the communication with the device 300 using the connection information of the device corresponding to the function specified in the process in step S406, which is received in step S404, and thus the connection is terminated. Although FIG. 13 illustrates only one device 300, the information processing apparatus 100 may be disconnected from a plurality of devices.

When the connection is terminated in step S412, the information processing apparatus 100 releases the function specified in the process in step S406 (S414). The information processing apparatus 100 may delete data corresponding to the added function from the function information in which the update for function addition is performed, and thus the function specified in the process in step S406 is deleted from the function of its own apparatus. The information processing apparatus according to the present embodiment may update a relational database or the like and may release the association between the function information and the attribute information, and thus the function specified in the process in step S406 may be deleted from the function of its own apparatus.

The service providing apparatus 400, when receiving the apparatus-related information (the spatial information, the release information, the attribute information, and the connection information) transmitted from the information processing apparatus 100 in step S410, updates the function of the information processing apparatus 100 (S416).

The service providing apparatus 400 may determine that the extended function is released in the information processing apparatus 100 based on the acquired release information, and may specify a function to be released by performing a process similar to that of step S406. The service providing apparatus 400 may delete the function to be released from the table (or database) as shown in the portion B of FIG. 9 by performing a process similar to that of step S406, and thus the function of the information processing apparatus 100 is updated.

When the function of the information processing apparatus 100 is updated in step S416, the service providing apparatus 400 determines a service to be discontinued based on the acquired spatial information and the function information (S418). The service providing apparatus 400 may determine a service to be discontinued, for example by performing a process similar to step S322 of FIG. 11 using the spatial information and the function information. In the example shown in FIG. 13, the conference support service (an example of the service on the conference management) being executed in FIG. 11 is determined as a service to be discontinued in step S418.

If a service to be discontinued is determined in step S418, the service providing apparatus 400 stops the execution of the process for the conference support service that is the process for the determined service (S420). The service providing apparatus releases the reservation for the conference room with the stoppage of the execution of the process for the conference support service (S422). Then, the service providing apparatus 400 transmits data indicating a result in which the service is discontinued to the information processing apparatus 100 (S424).

The information processing apparatus 100, when receiving the data that indicates the stoppage of service and is transmitted from the service providing apparatus in step S424, notifies the contents represented by the data indicating that the stoppage of service to the user (S426). The information processing apparatus 100 may control a display device or an audio output device to perform a visual notification using an image or text or perform an audible notification using voice.

If the execution of the process for the conference support service is stopped in step S420, the service providing apparatus 400 records materials of the conference on a recording medium (S428).

The information processing system according to the present embodiment may perform the process as shown in FIG. 13. The process as shown in FIG. 13 allows the information processing apparatus 100 to release the function extended by the process or the like shown in FIG. 11. For example, the process shown in FIG. 13 may allow the service providing apparatus 400 to terminate the provision of the service provided by the process shown in FIG. 11.

The process of releasing the extended function and terminating the service performed in the information processing system according to the present embodiment is not limited to the example shown in FIG. 13.

For example, in the information processing system according to the present embodiment, it is also possible to perform a predetermined user operation, such as a release operation used to start the release of function for the information processing apparatus 100 by the user, and to release the extended function using the predetermined user operation as a trigger.

When the extended function is released based on the predetermined user operation, the information processing apparatus 100 may perform the process in steps S406, S412, and S414 shown in FIG. 13 by using the attribute information, connection information, and spatial information that are stored in a recording medium such as a storage unit (described later). Thus, the extended function is released. When the extended function is released based on the predetermined user operation, the information processing apparatus 100 generates the release information based on the predetermined user operation and thus the process in step S410 of FIG. 13 is performed.

(iii) Third Example of Process in Information Processing System According to Embodiment In the above, the example of the process in the case where the service providing apparatus according to the present embodiment provides the service on conference management has been described as the first and second examples of the process in the information processing system according to the present embodiment. However, as described above, the service provided by the service providing apparatus according to the present embodiment is not limited to the service on conference management. An example of the process in the case where the service providing apparatus according to the present embodiment provides a so-called service on satellite office is illustrated as a third example of the process in the information processing system according to the present embodiment.

Figure 14:
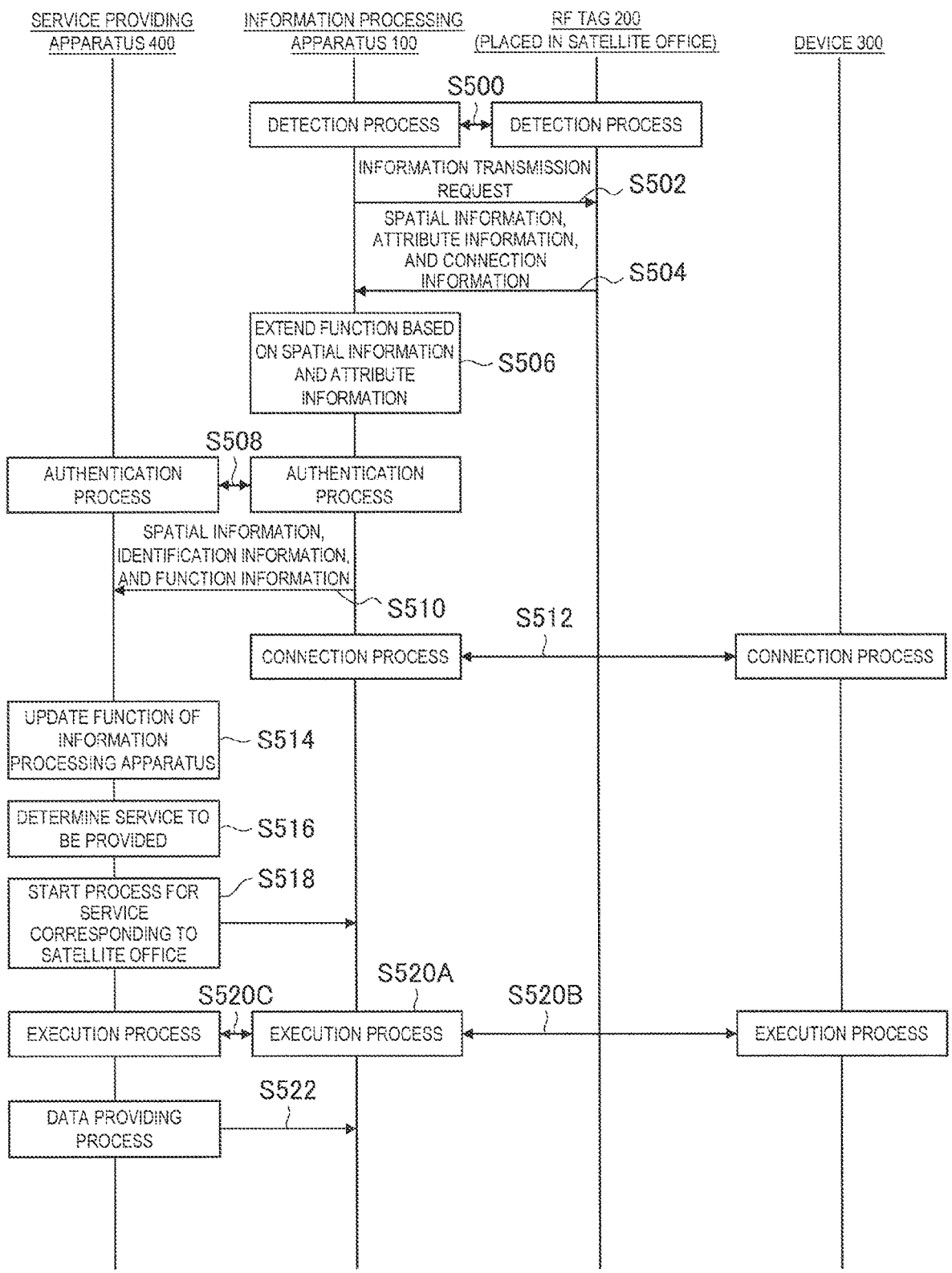
FIG. 14 is a diagram illustrated to describe a third example of the process in an information processing system according to the present embodiment.

FIG. 14 is a diagram illustrated to describe the third example of the process in the information processing system according to the present embodiment. FIG. 14 illustrates an example of the process in the information processing system according to the present embodiment in the case where the information processing apparatus 100 acquires the spatial information, the attribute information, and the connection information from the RF tag 200, which may be similar to FIG. 11.

In FIG. 14, the process in steps S500 to S504 in the information processing apparatus 100 may correspond to the process of the above item (1) (acquisition control process). In FIG. 14, the process in steps S506 to S512 in the information processing apparatus 100 may correspond to the process of the above item (2) (function control process).

In FIG. 14, the process in step S516 in the service providing apparatus 400 may correspond to the process of the above item (I) (determination process). In FIG. 14, the process in steps S518, S520C, and S522 in the service providing apparatus 400 may correspond to the process of the above item (II) (execution process). In FIG. 11, the process in step S514 in the service providing apparatus 400 may correspond to the process of the above item (III) (function management process).

For example, when the distance between the information processing apparatus 100 and the RF tag 200 is within the communicable range through the touch operation by the user, the information processing apparatus 100 and the RF tag 200 perform the detection process (S500), which is similar to step S300 of FIG. 11.

When the RF tag 200 is detected in step S500, the information processing apparatus 100 transmits an information transmission request (S502).

The RF tag 200, when receiving the information transmission request transmitted from the information processing apparatus 100 in step S502, transmits the information on the function extension in response to the information transmission request (S504). FIG. 14 illustrates an example in which the RF tag 200 transmits the spatial information, the attribute information, and the connection information, as the information on function extension.

The information processing apparatus 100, when receiving the spatial information, the attribute information, and the connection information transmitted from the RF tag 200 in step S504, extends the function based on the spatial information and the attribute information (S506), which may be similar to step S306 of FIG. 11.

The information processing apparatus 100 performs an authentication process between itself and the service providing apparatus 400, for example in a similar way to step S310 shown in FIG. 11, to be connected to the service providing apparatus 400 (S508). When the connection between the information processing apparatus 100 and the service providing apparatus 400 has been made, that is, when the information processing apparatus 100 and the service providing apparatus 400 are ready to communicate with each other, the information processing apparatus 100 does not have to perform the process in step S508 between itself and the service providing apparatus 400.

When the authentication process in step S508 is successfully completed and it is ready to communicate, the information processing apparatus 100 may transmit the apparatus-related information to the service providing apparatus 400 (S510). FIG. 14 illustrates an example in which the information processing apparatus 100 transmits the spatial information, the identification information, and the function information, as the apparatus-related information.

The information processing apparatus 100 performs the connection process for establishing the communication with the device 300 corresponding to the function extended by the process in step S506, for example in a similar way to step S318 of FIG. 11, and then starts the connection (S512). FIG. 14 illustrates only one device 300, but the information processing apparatus 100 can establish a connection to a plurality of devices as described above.

Although FIG. 14 illustrates an example in which the information processing apparatus 100 performs the process in step S512 after the process in step S508 is performed, the process in the information processing apparatus 100 is not limited thereto. For example, the information processing apparatus 100 may perform the process in steps S508 and S510 after the process in step S512 is performed, or may perform the process in steps S508 and S510 and the process in step S512 in synchronization with each other.

The service providing apparatus 400, when receiving the apparatus-related information (spatial information, identification information, and function information) transmitted from the information processing apparatus 100 in step S510, updates the function of the information processing apparatus 100 (S514), for example in a similar way to step S320 of FIG. 11.

When the function of the information processing apparatus 100 is updated in step S514, the service providing apparatus 400 determines a service to be provided for the information processing apparatus 100 (S516). The service providing apparatus 400 determines a service to be provided for the information processing apparatus 100, for example by performing the determination process according to the second example described in the above item (I-2). A description will be given of an example of a case where a service on the satellite office is determined as a service to be provided for the information processing apparatus 100 in step S516.

When a service to be provided for the information processing apparatus 100 is determined in step S516, the service providing apparatus 400 starts the process for the service corresponding to the satellite office that is the process for the determined service (S518). The service providing apparatus 400 may transmit the service information depending on the result by the process for the service to an appropriate information processing apparatus 100

The information processing apparatus 100 performs "a process to be completed solely by the information processing apparatus 100 using the inherent function of the information processing apparatus 100", "a process in cooperation with the device 300 (an example of the process using the extended function)", or "a process in cooperation with the service providing apparatus 400" (S520A, S520B, and S520C).

The service providing apparatus 400 provides data for introducing a store around a satellite office or a coupon available in the store (an example of content or data associated with the space indicated by the spatial information) for the information processing apparatus 100 as the service information depending on the result obtained by the process for the service (S522). The data for introducing a store around a satellite office or a coupon available in the store may be data generated by the service providing apparatus 400 or may be data acquired by the service providing apparatus 400 from an external server. In FIG. 14, the process in step S520C and the process in step S522 are illustrated as separate process, but the process in step S522 may be performed as part of the process in step S520C.

In the information processing system according to the present embodiment, the process as shown in FIG. 14 may be performed. For example, the process shown in FIG. 14 allows the information processing apparatus 100 to extend the function using the function of the external device 300 in a satellite office and to perform the process to be completed solely by the information processing apparatus 100 or perform the process in cooperation with the device 300 or the service providing apparatus 400. For example, the process shown in FIG. 14 allows the service providing apparatus 400 to provide a service corresponding to a satellite office (an example of the space where the function extension is performed by an external device), such as a service regarding satellite office for the information processing apparatus 100 whose function is extended using the function of the external device.

In the information processing system according to the present embodiment, it should be understood that the process for extending the function of the information processing apparatus 100 and the process for providing the service regarding satellite office by the service providing apparatus 400 are not limited to the example shown in FIG. 14.

(Information Processing Apparatus According to Embodiment)

Next, an exemplary configuration of the information processing apparatus according to the present embodiment that is capable of performing the process for implementing the information processing method according to the present embodiment as described above will be described.

Figure 15:
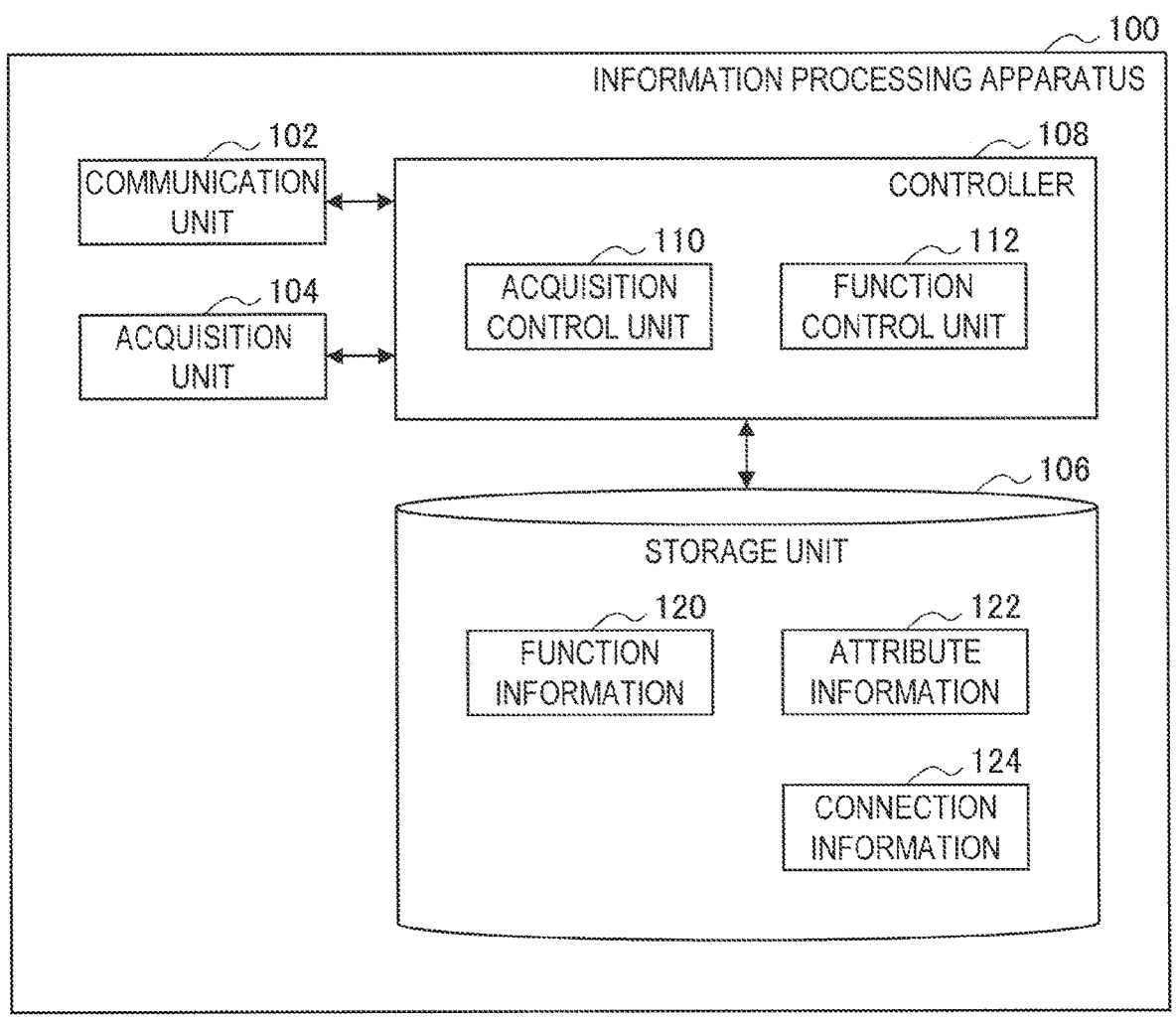
FIG. 15 is a block diagram illustrating an exemplary configuration of the information processing apparatus according to the present embodiment.

FIG. 15 is a block diagram illustrating an exemplary configuration of an information processing apparatus 100 according to the present embodiment. The information processing apparatus 100 is configured to include, for example, a communication unit 102, an acquisition unit 104, a storage unit 106, and a controller 108.

The information processing apparatus 100 may be configured to include, for example, a read-only memory (ROM; not illustrated), a RAM (not illustrated), a user-operable operation unit (not illustrated), and a display unit (not illustrated) for displaying various screens on a display screen. In the information processing apparatus 100, the components may be interconnected via a bus that serves as a data transmission channel.

The ROM (not illustrated) stores a program used by the controller 108 or control data such as arithmetic parameters. The RAM (not illustrated) temporarily stores a program executed by the controller 108.

An example of the operation unit (not illustrated) includes an operation input device to be described below and an example of the display unit (not illustrated) includes a display device to be described below.

[Example of Hardware Configuration of Information Processing Apparatus 100]

Figure 16:
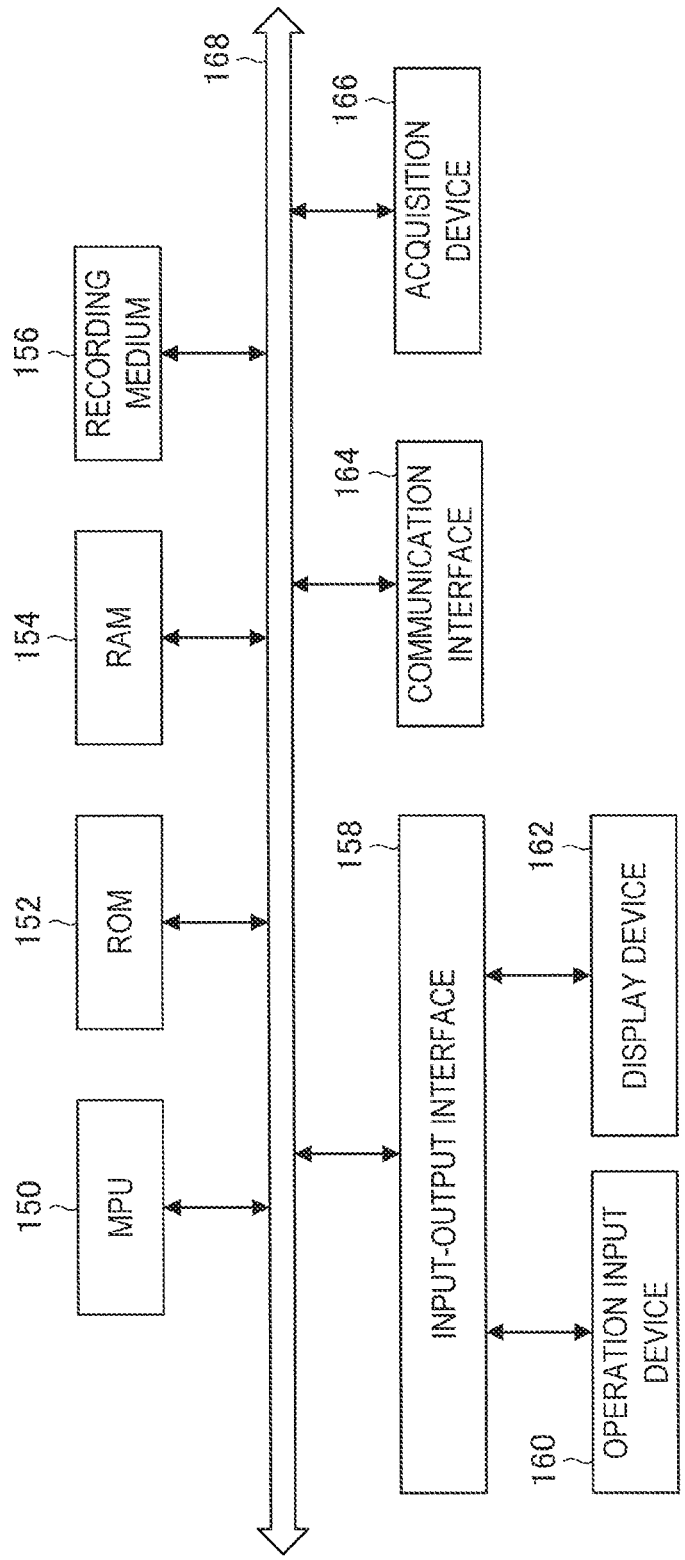
FIG. 16 is a diagram illustrated to describe an exemplary hardware configuration of the information processing apparatus according to the present embodiment.

FIG. 16 is a diagram illustrated to describe an exemplary hardware configuration of the information processing apparatus 100 according to the present embodiment. The information processing apparatus 100 is configured to include, for example, an MPU 150, a ROM 152, a RAM 154, a recording medium 156, an input-output interface 158, an operation input device 160, a display device 162, a communication interface 164, and an acquisition device 166. In the information processing apparatus 100, the components are interconnected via a bus 168 that serves as a data transmission channel.

The MPU 150 includes, for example, a MPU and various processing circuits and functions as the controller 108 that controls the entire information processing apparatus 100. In the information processing apparatus 100, the MPU 150 serves as, for example, an acquisition control unit 110 and a function control unit 112, which will be described later.

The ROM 152 stores control data such as calculation parameters and a program used by the MPU 150. The RAM 154 temporarily stores, for example, a program executed by the MPU 150.

The recording medium 156 functions as the storage unit 106. The recording medium 156 stores information about the information processing method according to the present embodiment such as function information, attribute information, connection information, and spatial information, and stores various data such as applications. Examples of the recording medium 156 include a magnetic recording medium such as hard disk, and nonvolatile memory such as flash memory. The recording medium 156 may be a tamper-resistant recording medium, or may be removable from the information processing apparatus 100.

The input-output interface 158 may be used for the connection of the operation input device 160 or the display device 162. The operation input device 160 functions as an operation unit (not illustrated) and the display device 162 functions a display unit (not illustrated). Here, examples of the input-output interface 158 include a universal serial bus (USB) terminal, a digital visual interface (DVI) terminal, a high-definition multimedia interface (HDMI) (registered trademark) terminal, and various processing circuits. For example, the operation input device 160 is provided, for example, on the information processing apparatus 100 and is connected to the input-output interface 158 in the information processing apparatus 100. Examples of the operation input device 160 include a button, a direction key, a rotation type selector such as a jog dial, and a combination thereof. For example, the display device 162 is provided on the information processing apparatus 100 and is connected to the input-output interface 158 in the information processing apparatus 100. Examples of the display device 162 include a liquid crystal display (LCD) and an organic electroluminescence (EL) display (also called an organic light emitting diode (OLED) display).

It will be understood that the input-output interface 158 may be connected to an operation input device (e.g., keyboard or mouse) or an external device such as a display device, which serves as an external apparatus of the information processing apparatus 100. The display device 162 may be a device such as a touch panel having an ability to display and to be operated by the user.

The communication interface 164 functions as the communication unit 102 for communicating with an external device or an external apparatus such as the service providing apparatus according to the present embodiment by wire or wireless through a network (or directly). Examples of the first communication interface 164 include various communication devices capable of communicating with an external apparatus, such as a communication antenna and radio frequency (RF) circuit (wireless communication), an IEEE 802.15.1 port and transmission-reception circuit (wireless communication), an IEEE 802.11 port and transmission-reception circuit (wireless communication), or a local area network (LAN) terminal and transmission-reception circuit (wired communication).

The acquisition device 166 may function as the acquisition unit 104 configured to acquire the information on the function extension according to the present embodiment from the external object according to the present embodiment.

Examples of the acquisition device 166 include an NFC or RFID-enabled communication device, such as a transmission-reception circuit that serves as an interrogator in NFC communication (e.g. a transmission-reception circuit serving as a reader-writer) and a transmission-reception circuit that serves as a transponder in NFC communication (e.g. an IC chip). The acquisition device 166 may be provided with an antenna to establish communication through the antenna, or may be connected to an external antenna to establish communication through the external antenna.

The acquisition device 166 is not limited to the NFC or RFID-enabled communication device. For example, the acquisition device 166 may be a communication device of any communication system, including a communication device that communicates using a signal of an audio frequency band such as modem and an optical communication device that communicates using light such as visible light or infrared rays.

When the acquisition device 166 is the communication device, the acquisition device 166 can also be provided with a plurality of communication devices having the same communication system or having different communication systems. When the acquisition device 166 is provided with a plurality of communication devices, the acquisition device 166 may be configured to include a single IC, or may be configured to include a plurality of ICs. When the acquisition device 166 is provided with a plurality of communication devices, the acquisition device 166 may be configured to include an antenna, or may be connected to an external antenna.

The acquisition device 166 is not limited to the communication device. For example, the acquisition device 166 may be an imaging device for capturing an image (moving or still image). When the acquisition device 166 is the imaging device, the acquisition device 166 acquires the information on the function extension according to the present embodiment, for example, by capturing an image of the external object according to the present embodiment.

Examples of the imaging device according to the present embodiment include a lens/image sensor unit and a signal processing circuit. The lens/image sensor unit is composed of, for example, an optical lens and an image sensor that employs a plurality of complementary metal oxide semiconductor (CMOS) or equivalent imaging elements. The signal processing circuit includes an automatic gain control (AGC) circuit or an analog-to-digital converter (ADC), and converts an analog signal generated by the image sensor into a digital signal (image data). The signal processing circuit may perform various processes relating to RAW development. The signal processing circuit may perform various signal processing including white balance correction processing, color correction processing, gamma correction processing, YCbCr conversion processing, and edge enhancement processing.

The information processing apparatus 100 that has, for example, the configuration shown in FIG. 16 performs the process for implementing the information processing method according to the present embodiment. The hardware configuration of the information processing apparatus 100 according to the present embodiment is not limited to that shown in FIG. 16.

For example, when the acquisition device 166 that functions as the acquisition unit 104 is the communication device, the communication interface 164 that functions as the communication unit 102 can also function as the acquisition unit 104.

When the acquisition device 166 that functions as the acquisition unit 104 is the communication device, the communication interface 164 and the acquisition device 166 may be configured as a single IC, or may be configured as a plurality of ICs. When the communication interface 164 and the acquisition device 166 are configured as a single IC, the IC may be configured to include an antenna, or may be connected to an external antenna.

The information processing apparatus 100, for example when communicating with an external device or an external apparatus such as the service providing apparatus through an external communication device, may be provided with the communication interface 164.

The information processing apparatus 100, for example when acquiring the information on the function extension from an external object by communication through an external communication device or by imaging with an external imaging device, may not be provided with the acquisition device 166.

Furthermore, it is possible for the information processing apparatus 100 to be provided with the recording medium 156, the operation device 160, or the display device 162.

Referring again to FIG. 15, an example of the configuration of the information processing apparatus 100 will be described. The communication unit 102 may communicate with an external device or an external apparatus such as the service providing apparatus according to the present embodiment by wire or wireless through a network (or directly). The reception of a signal by the communication unit 102 may be controlled by the controller 108. Examples of the communication unit 102 include various communication devices capable of communication with an external apparatus, such as an IEEE 802.15.1 port and transmission-reception circuit, or a LAN terminal and transmission-reception circuit.

The acquisition unit 104 acquires the information on the function extension according to the present embodiment from an external object. The acquisition of the information on the function extension from the external object in the acquisition unit 104 may be controlled by the controller 108 (more specifically, an acquisition control unit 110 described later). Examples of the acquisition unit 104 include a communication device capable of communication with an external object (e.g. an NFC or RFID-enabled communication device) or an acquisition device such as an imaging device for capturing an image of an external object.

The storage unit 106 is a means of storage provided in the information processing apparatus 100. The storage unit 106 may store information about the information processing method according to the present embodiment such as function information, attribute information, connection information, and spatial information, and stores various data such as applications. FIG. 16 illustrates an example in which the storage unit 106 stores function information 120, attribute information 122, and connection information 124.

Examples of the storage unit 106 include a magnetic recording medium such as hard disk and nonvolatile memory such as flash memory. The storage unit 106 may be a tamper-resistant recording medium, or may be removable from the information processing apparatus 100.

The controller 108 may be composed of an MPU or the like and serves to control the entire information processing apparatus 100. The controller 108 may be configured to include the acquisition control unit 110 and the function control unit 112, and the controller 108 takes a leading role in performing the process for implementing the information processing method according to the present embodiment.

The acquisition control unit 110 takes a leading role in performing the process of the above item (1) (acquisition control process). The acquisition control unit 110 acquires the information on the function extension according to the present embodiment from the external object. The acquisition control unit 110 acquires the information on the function extension from the external object, for example, by controlling an acquisition device that constitutes the acquisition unit 104 or an external acquisition device having a function corresponding to the acquisition unit 104.

The function control unit 112 takes a leading role in performing the process of the above item (2) (function control process). The function control unit 112 extends the function of its own apparatus by setting the function indicated by the attribute information as the function of its own apparatus based on the attribute information contained in the acquired information on the function extension. The function control unit 112 connects to a device that corresponds to the extended function based on the connection information contained in the acquired information on the function extension, and then enables the extended function.

More specifically, the function control unit 112 may perform the function control process according to the first to sixth examples described in the above items (2-1) to (2-6).

The controller 108 may be configured to include the acquisition control unit 110 and the function control unit 112, and thus the controller 108 takes a leading role in performing the process for implementing the information processing method according to the present embodiment.

The information processing apparatus 100, for example, having the configuration shown in FIG. 15 performs the process for implementing the information processing method according to the present embodiment (e.g. the process of the above item (1) (acquisition control process) and the process of the above item (2) (function control process)).

Thus, the information processing apparatus 100, for example, having the configuration shown in FIG. 15 can extend its function using the function of the external device.

The information processing apparatus 100, for example, having the configuration shown in FIG. 15 can obtain the advantages achieved by performing the process for implementing the information processing method according to the present embodiment.

The configuration of the information processing apparatus according to the present embodiment is not limited to that shown in FIG. 15.

For example, the information processing apparatus according to the present embodiment can be configured to include one or both of the acquisition control unit 110 and the function control unit 112 shown in FIG. 15, separately (e.g. as a separate processing circuit) from the controller 108. When the acquisition control unit 110 is provided separately from the controller 108, the acquisition control unit 110 may be configured as an integral unit with the acquisition unit 104 or may be configured as a separate unit from the acquisition unit 104.

For example, when the communication is established with an external device or an external apparatus such as the service providing apparatus through an external communication device having the function and configuration similar to the communication unit 102, the communication unit 102 may not be provided.

For example, when the information on the function extension according to the present embodiment is acquired by controlling an external acquisition device having the function and configuration similar to the acquisition unit 104, the information processing apparatus according to the present embodiment may be configured to not include the acquisition unit 104.

For example, the information about the information processing method such as the function information stored in an external recording medium such as an external recording medium being connected or a recording medium provided in the external apparatus may be used in performing the process by the information processing apparatus according to the present embodiment. In this case, the information processing apparatus according to the present embodiment may be configured to not include the storage unit 106.

(Service Providing Apparatus According to Embodiment)

An exemplary configuration of the service providing apparatus according to the present embodiment capable of performing the process for implementing the service providing method according to the present embodiment described above will be described below.

Figure 17:
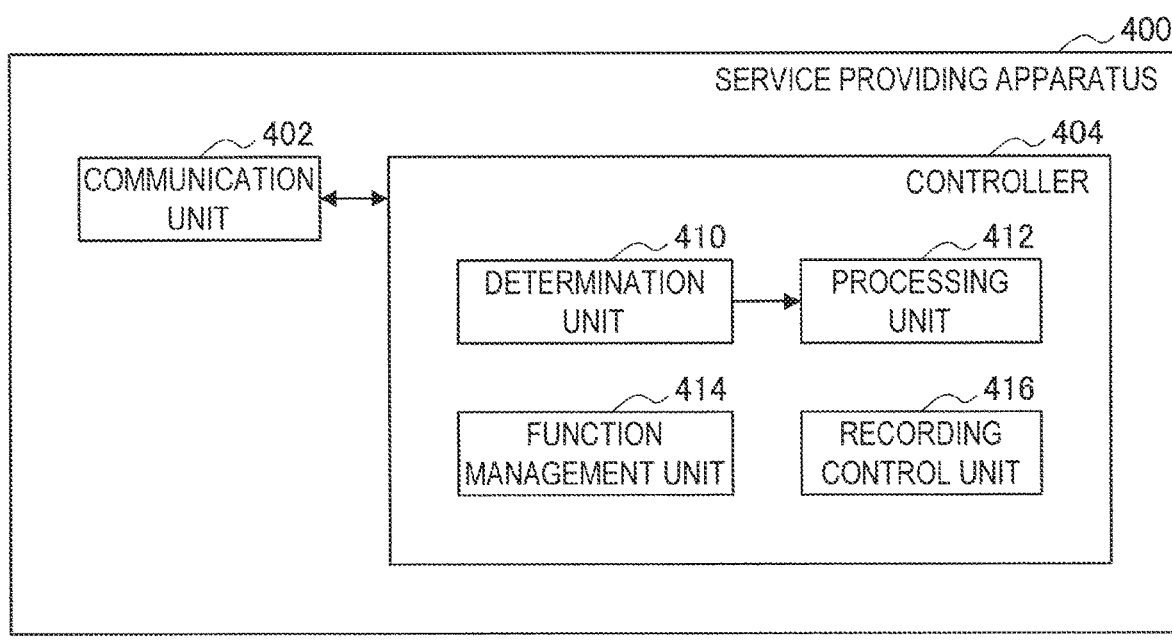
FIG. 17 is a block diagram illustrating an exemplary configuration of the service providing apparatus according to the present embodiment.

FIG. 17 is a block diagram illustrating an exemplary configuration of the service providing apparatus 400 according to the present embodiment. The service providing apparatus 400 may be configured to include a communication unit 402 and a controller 404.

The service providing apparatus 400 may be configured to include a ROM (not shown), a RAM (not shown), a storage unit (not shown) configured to store various information, an operation unit (not shown) that can be operated by the user, and a display unit (not shown) for displaying various pictures on a display screen. In the service providing apparatus 400, the components described above are interconnected via a bus that serves as a data transmission channel.

The ROM (not shown) stores a program used by the controller 404 or stores control data such as an operation parameter. The RAM (not shown) stores a program or the like executed by the controller 404 in a temporary fashion.

Examples of the operation unit (not shown) include an operation input device described later. Examples of the display unit (not shown) include a display device described later.

[Exemplary Hardware Configuration of Service Providing Apparatus 400]

Figure 18:
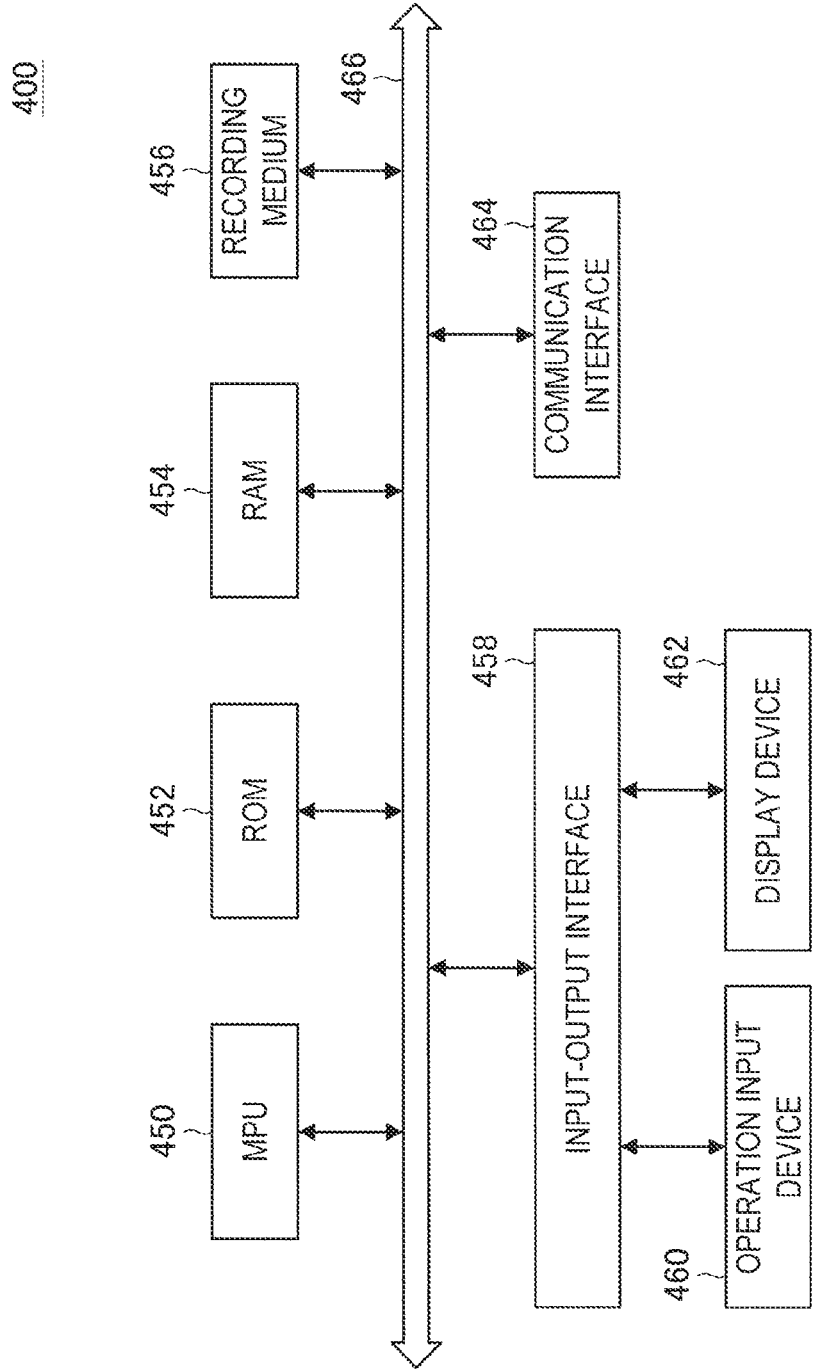
FIG. 18 is a diagram illustrated to describe an exemplary hardware configuration of the service providing apparatus according to the present embodiment.

FIG. 18 is a diagram illustrated to describe an exemplary hardware configuration of the service providing apparatus 400 according to the present embodiment. The service providing apparatus 400 is configured to include, for example, an MPU 450, a ROM 452, a RAM 454, a recording medium 456, an input-output interface 458, an operation input device 460, a display device 462, and a communication interface 464. In the service providing apparatus 400, the components described above are interconnected via a bus 466 that serves as a data transmission channel.

The MPU 450 may be configured to include a processor such as MPU and various processing circuits, and functions as the controller 404 that controls the entire service providing apparatus 400. The MPU 450 may serve as a determination unit 410, a processing unit 412, a function management unit 414, and a recording control unit 416 that will be described later, in the service providing apparatus 400.

The ROM 452 stores a program used by the MPU 450 or stores control data such as an operation parameter. The RAM 454 stores a program or the like executed by the MPU 450 in a temporary fashion.

The recording medium 456 functions as the storage unit (not shown), and stores information related to the service providing method according to the present embodiment, such as the table (or database) shown in the portion A of FIG. 9 or the table (or database) shown in the portion B of FIG. 9 or various data such as applications. Examples of the recording medium 456 include a magnetic recording medium such as hard disk, and nonvolatile memory such as flash memory. The recording medium 456 may be removable from the service providing apparatus 400.

The input-output interface 458 may be used for the connection of the operation input device 460 or the display device 462. The operation input device 460 functions as an operation unit (not shown), and the display device 462 functions a display unit (not shown). Examples of the input-output interface 458 include a USB terminal, a DVI terminal, an HDMI (registered trademark) terminal, and various processing circuits. The operation input device 460 may be provided on the service providing apparatus 400 and may be connected to the input-output interface 458 in the service providing apparatus 400. Examples of the operation input device 460 include a button, a direction key, a rotation type selector such as a jog dial, and a combination thereof. For example, the display device 462 may be provided on the service providing apparatus 400 and may be connected to the input-output interface 458 in the service providing apparatus 400. Examples of the display device 462 include a liquid crystal display and an organic EL display.

It should be understood that the input-output interface 458 may be connected to an external device such as an operation input device (e.g., keyboard or mouse) or a display device, which serves as an external apparatus of the service providing apparatus 400. The display device 462 may be a device such as a touch panel having an ability to display and to be operated by the user.

The communication interface 464 functions as the communication unit 402 for communicating with an external apparatus such as the information processing apparatus according to the present embodiment by wire or wireless through a network (or directly). Examples of the first communication interface 464 include various communication devices capable of communicating with an external apparatus, such as a communication antenna and RF circuit (wireless communication), an IEEE 802.15.1 port and transmission-reception circuit (wireless communication), an IEEE 802.11 port and transmission-reception circuit (wireless communication), or a LAN terminal and transmission-reception circuit (wired communication).

The service providing apparatus 400 having the configuration shown in FIG. 18 can perform the process for implementing the information processing method according to the present embodiment. The hardware configuration of the service providing apparatus 400 according to the present embodiment is not limited to the configuration shown in FIG. 18.

For example, when the service providing apparatus 400 communicates with an external apparatus such as an external device and a service providing apparatus through an external communication device, the service providing apparatus 400 may be configured without the communication interface 464.

The service providing apparatus 400 can be configured without the recording medium 456, the operation device 460, and the display device 462.

Referring again to FIG. 17, an example of the configuration of the service providing apparatus 400 will be described. The communication unit 402 may communicate with an external apparatus such as the information processing apparatus according to the present embodiment by wire or wireless through a network (or directly). The reception of a signal by the communication unit 402 may be controlled by the controller 404. Examples of the communication unit 402 include various communication devices capable of communicating with an external apparatus, such as an IEEE 802.15.1 port and transmission-reception circuit or a LAN terminal and transmission-reception circuit.

The controller 404 may be composed of an MPU or the like and serves to control the entire service providing apparatus 400. The controller 404 may be configured to include the determination unit 410, the processing unit 412, the function management unit 414, and the recording control unit 416. The controller 404 plays a leading role in performing the process for implementing the service providing method according to the present embodiment.

The determination unit 410 plays a leading role in performing the process of the above item (I) (determination process), and determines a service to be provided for the information processing apparatus according to the present embodiment based on the apparatus-related information acquired from the information processing apparatus according to the present embodiment.

More specifically, the determination unit 410 may perform the determination processes according to the first to fifth examples described in the above items (I-1) to (I-5).

The processing unit 412 plays a leading role in performing the process of the above item (II) (execution process), and executes the process for the service determined to be provided in the determination unit 410.

The processing unit 412 may transmit the service-related service information, which corresponds to the executed process for the service, to the information processing apparatus according to the present embodiment.

The processing unit 412 may perform the execution processes according to the first to third examples described in the above items (II-1) to (II-3).

The function management unit 414 plays a leading role in performing the process of the above item (III) (function management process), and manages the function of the information processing apparatus according to the present embodiment.

More specifically, the function management unit 414 may manage the function of the information processing apparatus according to the present embodiment by updating the function of the information processing apparatus indicated by the identification information based on the acquired function information and identification information. The function management unit 414 may manage the function of a plurality of information processing apparatuses for each of the information processing apparatuses by updating the function of the information processing apparatus according to the present embodiment for each of the information processing apparatuses.

The recording control unit 416 plays a leading role in performing the process of the above item (IV) (recording control process). When the execution of the process for the service being provided for the information processing apparatus according to the present embodiment is terminated, the recording control unit 416 records the information on the process for the service being executed on a recording medium. When the execution of the process for the service being provided for the information processing apparatus according to the present embodiment by the execution processes according to the first to third examples described in the above items (II-1) to (II-3) is terminated, the recording control unit 416 records the information on the process for the service being executed on a recording medium.

The controller 404 configured to include the determination unit 410, the processing unit 412, the function management unit 414, and the recording control unit 416 can play a leading role in performing the process for implementing the service providing method according to the present embodiment.

The service providing apparatus 400 having the configuration shown in FIG. 17 can perform the process for implementing the service providing method according to the present embodiment (e.g. "the process of the above item (I) (determination process) and the process of the above item (II) (execution process), or one or both of the process of the above items (I) (determination process) and (II) (execution process) and the process of the above item (III) (function management process) and (IV) (recording control process)).

Thus, the service providing apparatus 400 having the configuration shown in FIG. 17 can provide a service, which corresponds to the space where the function extension is performed using the external device determined based on the spatial information, for the information processing apparatus according to the present embodiment.

The service providing apparatus 400 having the configuration shown in FIG. 17 can obtain advantages achieved by performing the process for implementing the service providing method according to the present embodiment as described above.

The configuration of the service providing apparatus according to the present embodiment is not limited to that shown in FIG. 17.

For example, the service providing apparatus according to the present embodiment can be configured to include one or more of the determination unit 410, the processing unit 412, the function management unit 414, and the recording control unit 416 shown in FIG. 17 as a separate component (e.g. being implemented as a separate processing circuit) from the controller 404.

The service providing apparatus according to the present embodiment can be configured without one or both of the function management unit 414 and the recording control unit 416 shown in FIG. 17.

When the service providing apparatus is configured without one or both of the function management unit 414 and the recording control unit 416, the service providing apparatus according to the present embodiment is possible to perform the process of the above item (I) (determination process) and the process of the above item (II) (execution process). Thus, even when the service providing apparatus is configured without one or both of the function management unit 414 and the recording control unit 416, the service providing apparatus according to the present embodiment can provide a service, which corresponds to the space where the function extension is performed using the external device determined based on the spatial information, for the information processing apparatus according to the present embodiment.

For example, when the communication is established with an external apparatus such as the information processing apparatus according to the present embodiment through an external communication device having the function and configuration similar to the communication unit 402, the communication unit 402 does not have to be provided.

Although the above description has been given by exemplifying the information processing apparatus as an element included in the information processing system according to the present embodiment, the present embodiment is not limited thereto. The present embodiment is applicable to various types of devices including a tablet device, a communication device such as mobile phone or smartphone, a video/music playback device (or video/music recording and playback device), a game console, and a computer such as personal computer (PC). The present embodiment is also applicable to, for example, a processing IC that can be incorporated into such a device described above.

Although the above description has been given by exemplifying the external object as an element included in the information processing system according to the present embodiment, the present embodiment is not limited thereto. The present embodiment is applicable to various types of devices capable of communicating with the information processing apparatus according to the present embodiment, such as "a device capable of performing wireless communication between the information processing apparatus according to the present embodiment, using a wireless communication technology including NFC-based communication technology or RFID technology (e.g. RF tag (transponder), IC card (transponder), and reader-writer (interrogator))" or "a device capable of performing communication with the information processing apparatus according to the present embodiment based on any communication system". The present embodiment can be also applied to, for example, various codes including a two-dimensional code such as matrix type two-dimensional code or a three-dimensional code.

Although the above description has been given by exemplifying the device as an element included in the information processing system according to the present embodiment, the present embodiment is not limited thereto. The present embodiment is applicable to any device having various functionalities, including the display device, speaker, keyboard, and mouse as shown in FIGS. 3 and 4. The present embodiment is also applicable to any device having various functionalities, including a tablet device, a communication device such as mobile phone or smartphone, a video/music playback device (or video/music recording and playback device), a game console, and a computer such as personal computer (PC).

Although the above description has been given by exemplifying the service providing apparatus as an element included in the information processing system according to the present embodiment, the present embodiment is not limited thereto. The present embodiment can be applied to various devices, including a computer such as PC or server. The present embodiment may be implemented as a system that constitutes a plurality of devices based on the connection to a network (or communication among devices) such as cloud computing. In other words, the process for implementing the service providing method according to the present embodiment may be implemented by a system including a plurality of apparatuses on the premise of the connection to a network (or communication among apparatuses), such as cloud computing.

(Program According to Embodiment)

[1] Program for Functioning as Information Processing Apparatus According to Embodiment The function can be extended using the function of an external device by allowing a program for causing a computer to function as the information processing apparatus according to the present embodiment (e.g. the process of the above item (1) (acquisition control process) and the process of the above item (2) (function control process)) to be executed by a processor or other processing units in the computer.

It is also possible to obtain the advantages achieved by performing the process for implementing the information processing method according to the present embodiment by allowing a program for causing a computer to function as the information processing apparatus according to the present embodiment to be executed by a processor or other processing units in the computer.

[2] Program for Functioning as Service Providing Apparatus According to Embodiment The execution of a program (e.g. a program that can be used to execute the process for implementing the service providing method according to the present embodiment, such as "the process of the above item (I) (determination process) and the process of the above item (II) (execution process), or one or both of the process of the above items (I) (determination process) and (II) (execution process) and the process of the above item (III) (function management process) and (IV) (recording control process)) for causing a computer to function as the service providing apparatus according to the present embodiment by a processor or the like in the computer allows the service corresponding to the space where the function extension is performed by the external object determined based on the spatial information to be provided for the information processing apparatus according to the present embodiment.

The execution of a program for causing a computer to function as the service providing apparatus according to the present embodiment by a processor or the like in the computer makes it possible to obtain the advantages achieved by performing the process for implementing the service providing method according to the present embodiment described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the program (computer program) causing the computer to function as the information processing apparatus according to the embodiment or the service providing apparatus according to the present embodiment has been provided above. However, the embodiment can also provide a recording medium on which the foregoing programs are each stored or a recording medium on which both foregoing programs are stored.

The above-described configuration is an example of the embodiment and, of course, pertains to the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
A service providing apparatus including:
a determination unit configured to determine a service to be provided for an information processing apparatus based on apparatus-related information acquired from the information processing apparatus, the apparatus-related information including spatial information and function information, the spatial information being related to a space in which a function of the information processing apparatus is extended and being acquired from an external object by the information processing apparatus, the function information indicating the function of the information processing apparatus; and
a processing unit configured to execute a process for the service determined to be provided.

(2)
The service providing apparatus according to (1),
wherein the apparatus-related information further includes identification information allowing the information processing apparatus to be identified,
wherein the service providing apparatus further includes a function management unit configured to update function-indicating information corresponding to the information processing apparatus indicated by the identification information based on the function information and the identification information that have been acquired, the function-indicating information indicating the function of the information processing apparatus, and
wherein the determination unit determines the service to be provided for the information processing apparatus based on the acquired spatial information and a function indicated by the function-indicating information corresponding to the information processing apparatus indicated by the identification information, the function-indicating information being updated based on the acquired function information.

(3)
The service providing apparatus according to (2),
wherein the function management unit updates the function-indicating information corresponding to a plurality of information processing apparatuses for each of the information processing apparatuses, the function-indicating information indicating the function of the information processing apparatus, and
wherein the determination unit further determines the service to be provided for the information processing apparatus based on a function indicated by the function-indicating information corresponding to another information processing apparatus being different from the information processing apparatus indicated by the identification information.

(4)
The service providing apparatus according to (1),
wherein the determination unit determines the service to be provided for the information processing apparatus based on the acquired spatial information and a function indicated by the function-indicating information corresponding to the information processing apparatus indicated by the acquired function information.

(5)
The service providing apparatus according to any one of (1) to (4),
wherein the apparatus-related information further includes release information for allowing an extended function to be released, the release information being acquired from the external object by the information processing apparatus,
wherein, when the release information is acquired, the determination unit determines a service to be discontinued among services being provided for the information processing apparatus based on the acquired apparatus-related information, and the processing unit terminates an execution of a process for the service determined to be discontinued.

(6)
The service providing apparatus according to (1),
wherein the apparatus-related information further includes identification information allowing the information processing apparatus to be identified,
wherein the service providing apparatus further includes a function management unit configured to update function-indicating information corresponding to the information processing apparatus indicated by the identification information based on the function information and the identification information that have been acquired, the function-indicating information indicating the function of the information processing apparatus,
wherein the determination unit determines a service to be discontinued among services being provided for the information processing apparatus based on the acquired spatial information and a function indicated by the function-indicating information corresponding to the information processing apparatus indicated by the identification information, the function-indicating information being updated based on the acquired function information, and
wherein the processing unit terminates an execution of a process for the service determined to be discontinued.

(7)
The service providing apparatus according to (6),
wherein the function management unit updates the function-indicating information corresponding to a plurality of information processing apparatuses for each of the information processing apparatuses, the function-indicating information indicating the function of the information processing apparatus, and
wherein the determination unit further determines the service to be discontinued among services being provided for the information processing apparatus based on a function indicated by the function-indicating information corresponding to another information processing apparatus being different from the information processing apparatus indicated by the identification information.

(8)
The service providing apparatus according to any one of (1) to (7),
wherein the processing unit selectively terminates an execution of the process for the service being provided for the information processing apparatus based on a detection result obtained by a detection device configured to detect a condition of a space corresponding to the spatial information.

(9)

The service providing apparatus according to any one of (1) to (8), wherein the processing unit transmits service-related service information corresponding to the process for a service being executed to the information processing apparatus.

(10)

The service providing apparatus according to any one of (5), and (6) to (8), wherein the processing unit, when an execution of the process for the service being provided for the information processing apparatus is terminated, records information on the process for the service being executed on a recording medium.

(11)

A service providing method executed by a service providing apparatus, the service providing method including:
a step of determining a service to be provided for an information processing apparatus based on apparatus-related information acquired from the information processing apparatus, the apparatus-related information including spatial information and function information, the spatial information being related to a space in which a function of the information processing apparatus is extended and the spatial information being acquired from an external object by the information processing apparatus, the function information indicating the function of the information processing apparatus; and
a step of executing a process for the service determined to be provided.

(12)

A program for causing a computer to execute:
a step of determining a service to be provided for an information processing apparatus based on apparatus-related information acquired from the information processing apparatus, the apparatus-related information including spatial information and function information, the spatial information being related to a space in which a function of the information processing apparatus is extended and being acquired from an external object by the information processing apparatus, the function information indicating the function of the information processing apparatus; and
a step of executing a process for the service determined to be provided.

REFERENCE SIGNS LIST 100 information processing apparatus
102, 402 communication unit
104 acquisition unit
106 storage unit
108, 404 controller
110 acquisition control unit
112 function control unit
200 RF tag
300A, 300B, 300C, 300D, 300 device
400 service providing apparatus
410 determination unit
412 processing unit
414 function management unit
416 recording control unit

The invention claimed is:

1. A service providing apparatus, comprising:
a Micro Processing Unit (MPU) configured to:
acquire apparatus-related information from a first information processing apparatus, wherein
the apparatus-related information comprises spatial information and function information,
the spatial information corresponds to a space in which a first function of the first information processing apparatus is extended,
the spatial information is acquired by the first information processing apparatus from an external object,
the spatial information indicates a location of the external object,
the external object is different from the service providing apparatus and the first information processing apparatus, and
the function information indicates the first function of the first information processing apparatus;
determine a condition of the space in which the first function is extended based on the location of the external object, wherein
the condition of the space changes based on the location of the external object, and
the condition of the space indicates a purpose of use of the first function in the space;
set a priority level for at least one attribute of the first function based on the purpose of use of the first function;
determine a first service for the first information processing apparatus based on the spatial information and the priority level, wherein the first service corresponds to the determined condition; and
execute a first process for the first service.

2. The service providing apparatus according to claim 1, wherein
the apparatus-related information further includes identification information to identify the first information processing apparatus, and
the MPU is further configured to:
update function-indicating information corresponding to the first information processing apparatus based on the function information and the identification information, wherein the function-indicating information indicates the first function of the first information processing apparatus; and
determine the first service based the first function indicated by the function-indicating information corresponding to the first information processing apparatus.

3. The service providing apparatus according to claim 2, wherein the MPU is further configured to:
update the function-indicating information that corresponds to each of a plurality of information processing apparatuses, wherein the plurality of information processing apparatuses includes the first information processing apparatus; and
determine the first service based on a second function indicated by the function-indicating information corresponding to a second information processing apparatus of the plurality of information processing apparatuses.

4. The service providing apparatus according to claim 1, wherein the MPU is further configured to determine the first service based on the first function that is indicated by function-indicating information corresponding to the first information processing apparatus.

5. The service providing apparatus according to claim 1, wherein the apparatus-related information further includes release information that enables the first information processing apparatus to release the first function which is extended, the release information is acquired, from the external object, by the first information processing apparatus, and the MPU is further configured to:
   determine a second service for the first information processing apparatus based on the apparatus-related information; and
   terminate a second process for the second service.

6. The service providing apparatus according to claim 1, wherein
the apparatus-related information further includes identification information to identify the first information processing apparatus, and
the MPU is further configured to:
   update function-indicating information corresponding to the first information processing apparatus based on the function information and the identification information, wherein the function-indicating information indicates the first function of the first information processing apparatus;
   determine a second service for the first information processing apparatus based on the spatial information and the first function indicated by the function-indicating information corresponding to the first information processing apparatus; and
   terminate a second process for the second service.

7. The service providing apparatus according to claim 6, wherein
the updated function-indicating information corresponds to each of a plurality of information processing apparatuses,
the plurality of information processing apparatuses includes the first information processing apparatus, and
the MPU is further configured to determine the second service for the first information processing apparatus based on a second function indicated by the function-indicating information corresponding to a second information processing apparatus of the plurality of information processing apparatuses.

8. The service providing apparatus according to claim 1, wherein the MPU is further configured to selectively terminate the first process based on the condition of the space corresponding to the spatial information.

9. The service providing apparatus according to claim 1, wherein the MPU is further configured to transmit service-related service information corresponding to the first process for the first service.

10. The service providing apparatus according to claim 5, wherein the MPU is further configured to record information of the second process on a recording medium based on the termination of the second process for the second service.

11. A method, comprising:
in a service providing apparatus:
   acquiring apparatus-related information from an information processing apparatus, wherein
      the apparatus-related information comprises spatial information and function information,
      the spatial information corresponds to a space in which a function of the information processing apparatus is extended,
      the spatial information is acquired by the information processing apparatus from an external object,
      the spatial information indicates a location of the external object,
      the external object is different from the service providing apparatus and the information processing apparatus, and
      the function information indicates the function of the information processing apparatus;
   determining a condition of the space in which the function is extended based on the location of the external object, wherein
      the determined condition of the space changes based on the location of the external object, and
      the condition of the space indicates a purpose of use of the function in the space;
   setting a priority level for at least one attribute of the function based on the purpose of use of the function;
   determining a service to be provided for the information processing apparatus based on the spatial information and the priority level wherein the service corresponds to the determined condition; and
   executing a process for the determined service.

12. A non-transitory computer-readable medium having stored thereon computer-readable instructions, which when executed by a processor of a service providing apparatus, cause the processor to execute operations, the operations comprising:
   acquiring apparatus-related information from an information processing apparatus, wherein
      the apparatus-related information comprises spatial information and function information,
      the spatial information corresponds to a space in which a function of the information processing apparatus is extended,
      the spatial information is acquired by the information processing apparatus from an external object,
      the spatial information indicates a location of the external object,
      the external object is different from the service providing apparatus and the information processing apparatus, and
      the function information indicates the function of the information processing apparatus;
   determining a condition of the space in which the function is extended based the location of the external object, wherein
      the determined condition of the space changes based on the location of the external object, and
      the condition of the space indicates a purpose of use of the function in the space;
   setting a priority level for at least one attribute of the function based on the purpose of use of the function;
   determining a service to be provided for the information processing apparatus based on the spatial information and the priority level wherein the service corresponds to the determined condition; and
   executing a process for the determined service.

13. The service providing apparatus according to claim 1, wherein the location of the external object is indicated by a global positioning system (GPS) location of the external object.

* * * * *